(12) United States Patent
Lehmann et al.

(10) Patent No.: US 11,487,362 B1
(45) Date of Patent: Nov. 1, 2022

(54) ENCLOSURE WITH LOCALLY-FLEXIBLE REGIONS

(71) Applicant: Apple Inc., Cupertino, CA (US)

(72) Inventors: Alex J. Lehmann, Sunnyvale, CA (US); Robert Y. Cao, San Francisco, CA (US); Dinesh C. Mathew, San Francisco, CA (US); Mikael M. Silvanto, San Francisco, CA (US); Qiliang Xu, Livermore, CA (US); Paul X. Wang, Cupertino, CA (US); Robert J. Lockwood, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 63 days.

(21) Appl. No.: 16/989,657

(22) Filed: Aug. 10, 2020

Related U.S. Application Data

(63) Continuation of application No. 15/657,040, filed on Jul. 21, 2017, now Pat. No. 10,775,889.

(51) Int. Cl.
| | |
|---|---|
| *G06F 3/01* | (2006.01) |
| *G06F 3/0354* | (2013.01) |
| *G01L 1/16* | (2006.01) |
| *G06F 3/02* | (2006.01) |
| *G06F 3/044* | (2006.01) |

(52) U.S. Cl.
CPC .............. *G06F 3/016* (2013.01); *G01L 1/16* (2013.01); *G06F 3/03547* (2013.01); *G06F 3/0202* (2013.01); *G06F 3/044* (2013.01); *G06F 2203/04105* (2013.01)

(58) Field of Classification Search
CPC .... G06F 3/016; G06F 3/03547; G06F 3/0202; G06F 3/044; G06F 2203/04105; G01L 1/16
See application file for complete search history.

(56) References Cited

U.S. PATENT DOCUMENTS

| | | | |
|---|---|---|---|
| 5,196,745 | A | 3/1993 | Trumper |
| 5,293,161 | A | 3/1994 | Macdonald et al. |
| 5,424,756 | A | 6/1995 | Ho et al. |
| 5,434,549 | A | 7/1995 | Hirabayashi et al. |
| 5,436,622 | A | 7/1995 | Gutman et al. |

(Continued)

FOREIGN PATENT DOCUMENTS

| | | |
|---|---|---|
| CN | 101036105 A | 9/2007 |
| CN | 101409164 A | 4/2009 |

(Continued)

OTHER PUBLICATIONS

Hasser, et al., "Preliminary Evaluation of a Shape-Memory Alloy Tactile Feedback Display", Advances in Robotics, Mechantronics, and Haptic Interfaces, ASME, DSC—vol. 49, 1993, pp. 73-80.

(Continued)

*Primary Examiner* — Patrick N Edouard
*Assistant Examiner* — Eboni N Giles
(74) *Attorney, Agent, or Firm* — Dorsey & Whitney LLP

(57) ABSTRACT

A force input/haptic output interface for an electronic device can include a force input sensor and a haptic actuator. In one example, the force input sensor and the haptic actuator are accommodated on a frame positioned below an input surface. In many examples, the frame includes relieved portions that redirect and/or concentrate compression or tension in the haptic actuator into the frame.

20 Claims, 21 Drawing Sheets

(56) References Cited

U.S. PATENT DOCUMENTS

| | | |
|---|---|---|
| 5,668,423 A | 9/1997 | You et al. |
| 5,739,759 A | 4/1998 | Nakazawa et al. |
| 6,084,319 A | 7/2000 | Matsuki et al. |
| 6,342,880 B2 | 1/2002 | Rosenberg et al. |
| 6,373,465 B2 | 4/2002 | Jolly et al. |
| 6,388,789 B1 | 5/2002 | Bernstein |
| 6,438,393 B1 | 8/2002 | Suuronen |
| 6,445,093 B1 | 9/2002 | Binnard |
| 6,493,612 B1 | 12/2002 | Bisset et al. |
| 6,693,622 B1 | 2/2004 | Shahoian et al. |
| 6,777,895 B2 | 8/2004 | Shimoda et al. |
| 6,822,635 B2 | 11/2004 | Shahoian et al. |
| 6,864,877 B2 | 3/2005 | Braun et al. |
| 6,952,203 B2 | 10/2005 | Banerjee et al. |
| 6,988,414 B2 | 1/2006 | Ruehrig et al. |
| 7,068,168 B2 | 6/2006 | Girshovich et al. |
| 7,080,271 B2 | 7/2006 | Kardach et al. |
| 7,130,664 B1 | 10/2006 | Williams |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,323,959 B2 | 1/2008 | Naka et al. |
| 7,339,572 B2 | 3/2008 | Schena |
| 7,355,305 B2 | 4/2008 | Nakamura et al. |
| 7,370,289 B1 | 5/2008 | Ebert et al. |
| 7,392,066 B2 | 6/2008 | Haparnas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,656,388 B2 | 2/2010 | Schena et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynaenen et al. |
| 8,002,089 B2 | 8/2011 | Jasso et al. |
| 8,040,224 B2 | 10/2011 | Hwang |
| 8,053,688 B2 | 11/2011 | Conzola et al. |
| 8,063,892 B2 | 11/2011 | Shahoian et al. |
| 8,081,156 B2 | 12/2011 | Ruettiger |
| 8,125,453 B2 | 2/2012 | Shahoian et al. |
| 8,154,537 B2 | 4/2012 | Olien |
| 8,169,402 B2 | 5/2012 | Shahoian et al. |
| 8,174,495 B2 | 5/2012 | Takashima et al. |
| 8,174,512 B2 | 5/2012 | Ramstein et al. |
| 8,217,892 B2 | 7/2012 | Meadors |
| 8,232,494 B2 | 7/2012 | Purcocks |
| 8,248,386 B2 | 8/2012 | Harrison |
| 8,253,686 B2 | 8/2012 | Kyung et al. |
| 8,262,480 B2 | 9/2012 | Cohen et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,576,171 B2 | 11/2013 | Grant |
| 8,598,750 B2 | 12/2013 | Park |
| 8,598,972 B2 | 12/2013 | Cho et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,681,130 B2 | 3/2014 | Adhikari |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,797,153 B2 | 8/2014 | Vanhelle et al. |
| 8,803,670 B2 | 8/2014 | Steckel et al. |
| 8,834,390 B2 | 9/2014 | Couvillon, Jr. |
| 8,836,502 B2 | 9/2014 | Culbert et al. |
| 8,867,757 B1 | 10/2014 | Ooi |
| 8,872,448 B2 | 10/2014 | Boldyrev et al. |
| 8,878,401 B2 | 11/2014 | Lee |
| 8,907,661 B2 | 12/2014 | Maier et al. |
| 8,976,139 B2 | 3/2015 | Koga et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,104,285 B2 | 8/2015 | Colgate et al. |
| 9,122,330 B2 | 9/2015 | Bau et al. |
| 9,134,796 B2 | 9/2015 | Lemmens et al. |
| 9,172,669 B2 | 10/2015 | Swink et al. |
| 9,218,727 B2 | 12/2015 | Rothkopf et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,361,018 B2 | 6/2016 | Defazio et al. |
| 9,396,629 B1 | 7/2016 | Weber |
| 9,430,042 B2 | 8/2016 | Levin |
| 9,436,280 B2 | 9/2016 | Tartz et al. |
| 9,442,570 B2 | 9/2016 | Slonneger |
| 9,448,713 B2 | 9/2016 | Cruz-hernandez et al. |
| 9,449,476 B2 | 9/2016 | Lynn et al. |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Birnbaum et al. |
| 9,513,704 B2 | 12/2016 | Heubel et al. |
| 9,535,500 B2 | 1/2017 | Pasquero et al. |
| 9,539,164 B2 | 1/2017 | Sanders et al. |
| 9,557,830 B2 | 1/2017 | Grant |
| 9,600,037 B2 | 3/2017 | Pance et al. |
| 9,600,071 B2 | 3/2017 | Rothkopf |
| 9,632,583 B2 | 4/2017 | Virtanen et al. |
| 9,710,061 B2 | 7/2017 | Pance et al. |
| 9,829,981 B1 | 11/2017 | Ji |
| 9,886,090 B2 | 2/2018 | Silvanto et al. |
| 9,927,902 B2 | 3/2018 | Burr et al. |
| 9,940,013 B2 | 4/2018 | Choi et al. |
| 10,775,889 B1* | 9/2020 | Lehmann ............ G06F 3/03547 |
| 2003/0117132 A1 | 6/2003 | Klinghult |
| 2005/0036603 A1 | 2/2005 | Hughes |
| 2005/0230594 A1 | 10/2005 | Sato et al. |
| 2006/0017691 A1 | 1/2006 | Cruz-hernandez et al. |
| 2006/0196849 A1 | 9/2006 | Moeggenborg et al. |
| 2006/0209037 A1 | 9/2006 | Wang et al. |

(56) References Cited

U.S. PATENT DOCUMENTS

| | | |
|---|---|---|
| 2006/0223547 A1 | 10/2006 | Chin et al. |
| 2006/0252463 A1 | 11/2006 | Liao et al. |
| 2007/0106457 A1 | 5/2007 | Rosenberg |
| 2007/0152974 A1 | 7/2007 | Kim et al. |
| 2008/0062145 A1 | 3/2008 | Shahoian et al. |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0104409 A1 | 4/2009 | Derriey et al. |
| 2009/0115734 A1 | 5/2009 | Fredriksson et al. |
| 2009/0166098 A1 | 7/2009 | Sunder |
| 2009/0167702 A1 | 7/2009 | Nurmi |
| 2009/0167704 A1 | 7/2009 | Terlizzi et al. |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0243404 A1 | 10/2009 | Kim et al. |
| 2009/0267892 A1 | 10/2009 | Faubert |
| 2009/0313542 A1 | 12/2009 | Cruz-hernandez et al. |
| 2010/0116629 A1 | 5/2010 | Borissov et al. |
| 2010/0225600 A1 | 9/2010 | Dai et al. |
| 2010/0313425 A1 | 12/2010 | Hawes |
| 2010/0328229 A1 | 12/2010 | Weber et al. |
| 2011/0115754 A1 | 5/2011 | Cruz-hernandez |
| 2011/0128239 A1 | 6/2011 | Polyakov et al. |
| 2011/0132114 A1 | 6/2011 | Siotis |
| 2011/0205038 A1 | 8/2011 | Drouin et al. |
| 2012/0056825 A1 | 3/2012 | Ramsay et al. |
| 2012/0062491 A1 | 3/2012 | Coni et al. |
| 2012/0127071 A1 | 5/2012 | Jitkoff et al. |
| 2012/0127088 A1 | 5/2012 | Pance et al. |
| 2012/0235942 A1 | 9/2012 | Shahoian et al. |
| 2012/0327006 A1 | 12/2012 | Israr et al. |
| 2013/0016042 A1 | 1/2013 | Makinen et al. |
| 2013/0044049 A1 | 2/2013 | Biggs et al. |
| 2013/0188366 A1 | 7/2013 | Russell-clarke et al. |
| 2013/0207793 A1 | 8/2013 | Weaber et al. |
| 2013/0278401 A1 | 10/2013 | Flaherty et al. |
| 2014/0009441 A1 | 1/2014 | Bernstein et al. |
| 2014/0125470 A1 | 5/2014 | Rosenberg |
| 2014/0203953 A1* | 7/2014 | Moser ................ G06F 3/04886 341/27 |
| 2015/0071509 A1* | 3/2015 | Myers ................ G06V 40/1306 382/124 |
| 2015/0097800 A1 | 4/2015 | Grant et al. |
| 2015/0116205 A1 | 4/2015 | Westerman et al. |
| 2015/0126070 A1 | 5/2015 | Candelore |
| 2015/0130730 A1* | 5/2015 | Harley ................ G06F 3/016 345/173 |
| 2015/0135121 A1 | 5/2015 | Peh et al. |
| 2015/0224594 A1 | 8/2015 | Wort |
| 2015/0234493 A1 | 8/2015 | Parivar et al. |
| 2015/0277562 A1* | 10/2015 | Bard ................ G06F 3/016 345/177 |
| 2015/0338919 A1 | 11/2015 | Weber et al. |
| 2015/0349619 A1 | 12/2015 | Degner et al. |
| 2016/0077622 A1* | 3/2016 | Lee ................ G06F 1/1684 345/173 |
| 2016/0171767 A1 | 6/2016 | Anderson |
| 2016/0209979 A1 | 7/2016 | Endo et al. |
| 2016/0209984 A1* | 7/2016 | Richards ................ G06F 3/0418 |
| 2016/0328930 A1 | 11/2016 | Weber |
| 2017/0003744 A1 | 1/2017 | Bard et al. |
| 2017/0024010 A1 | 1/2017 | Weinraub |
| 2017/0249024 A1 | 8/2017 | Jackson et al. |
| 2017/0249049 A1* | 8/2017 | Wang ................ G06F 3/0412 |
| 2017/0315662 A1* | 11/2017 | Reynolds ................ G06F 3/0443 |
| 2018/0004336 A1* | 1/2018 | Shepelev ................ G02F 1/133514 |
| 2018/0033946 A1 | 2/2018 | Kemppinen et al. |
| 2018/0067604 A1* | 3/2018 | White ................ G06F 3/044 |
| 2018/0275810 A1* | 9/2018 | Khoshkava ................ G06F 3/0488 |
| 2018/0307373 A1* | 10/2018 | Wang ................ G06F 3/04182 |

FOREIGN PATENT DOCUMENTS

| | | |
|---|---|---|
| CN | 101663104 A | 3/2010 |
| CN | 101872257 A | 10/2010 |
| EP | 1686776 A1 | 8/2006 |
| EP | 2743798 A1 | 6/2014 |
| JP | 2004129120 A | 4/2004 |
| JP | 2004236202 A | 8/2004 |
| JP | 2010537279 A | 12/2010 |
| JP | 2010540320 A | 12/2010 |
| KR | 20050033909 A | 4/2005 |
| TW | 201035805 A | 10/2010 |
| WO | 02073587 A1 | 9/2002 |
| WO | 2006091494 A1 | 8/2006 |
| WO | 2007049253 A2 | 5/2007 |
| WO | 2007114631 A2 | 10/2007 |
| WO | 2009038862 A1 | 3/2009 |
| WO | 2010129892 A2 | 11/2010 |
| WO | 2013169303 A1 | 11/2013 |
| WO | 2014066516 A1 | 5/2014 |

OTHER PUBLICATIONS

Hill, et al., "Real-time Estimation of Human Impedance for Haptic Interfaces", Stanford Telerobotics Laboratory, Department of Mechanical Engineering, Stanford University, at least as early as Sep. 30, 2009, 6 pages.

Lee, et al., "Haptic Pen: Tactile Feedback Stylus for Touch Screens", Mitsubishi Electric Research Laboratories, http://wwwlmerl.com, Oct. 2004, 6 pages.

* cited by examiner

ENCLOSURE WITH LOCALLY-FLEXIBLE REGIONS

CROSS-REFERENCE TO RELATED APPLICATION(S)

This is a continuation of U.S. patent application Ser. No. 15/657,040, filed 21 Jul. 2017, entitled "ENCLOSURE WITH LOCALLY-FLEXIBLE REGIONS," the disclosure of which is hereby incorporated by reference in its entirety.

FIELD

Embodiments described herein relate to user interfaces for electronic devices, and in particular, to electronic device enclosures that include a distribution of locally-flexible regions that can be coupled to haptic actuators to provide haptic output to that user.

BACKGROUND

An input sensor for an electronic device can detect when a user applies a purposeful force, generally referred to as a "force input," to a surface of the electronic device. Such sensors, together with associated circuitry and structure, can be referred to as "force input sensors."

A mechanical actuator for an electronic device can generate a mechanical output, generally referred to as a "haptic output," through a surface of the electronic device. Such actuators, together with associated circuitry and structure, can be referred to as "haptic actuators."

In some cases, an electronic device can associate a force input sensor and a haptic actuator with the same surface, generally referred to as an "user interface surface." Conventionally, a user interface surface, such as a trackpad of a laptop computer, extends through an opening defined in an enclosure of the electronic device. However, as a result of the opening, the enclosure of the electronic device may be undesirably structurally weakened, increasing manufacturing complexity and susceptibility of the electronic device to damage.

SUMMARY

Embodiments described generally reference an electronic device that includes a force input/haptic output interface integrated into, or associated with, an enclosure of the electronic device. More specifically, an electronic device such as described herein is positioned in an enclosure that has an external surface (which may be contiguous) and an interior surface opposite the external surface. In many embodiments, a frame, internal to the enclosure, is coupled to the interior surface. The frame includes a locally-flexible region that is defined, at least in part, by a reduced-thickness section and a support structure adjacent to reduced-thickness section. A force transducer (such as a piezoelectric element) is coupled to the support structure. As a result of this construction, an actuation of the force transducer induces a bending moment into the support structure to generate a haptic output through the external surface.

In some embodiments, more than one locally-flexible region and, correspondingly, more than one force transducer may be associated with the frame. In other embodiments, the frame may be integrated with the interior surface of the enclosure. In many examples, the enclosure is formed from glass, but this is not required.

Further embodiments described generally reference an electronic device including an enclosure formed from glass that accommodates a keyboard in an upper region of an external surface. The enclosure also accommodates a force input/haptic output interface (such as described herein) in a lower region of the external surface, generally below the keyboard. In these examples, locally-flexible regions may not be required; a haptic actuator or a piezoelectric element can be coupled directly to an interior surface of the lower portion of the external surface of the enclosure.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
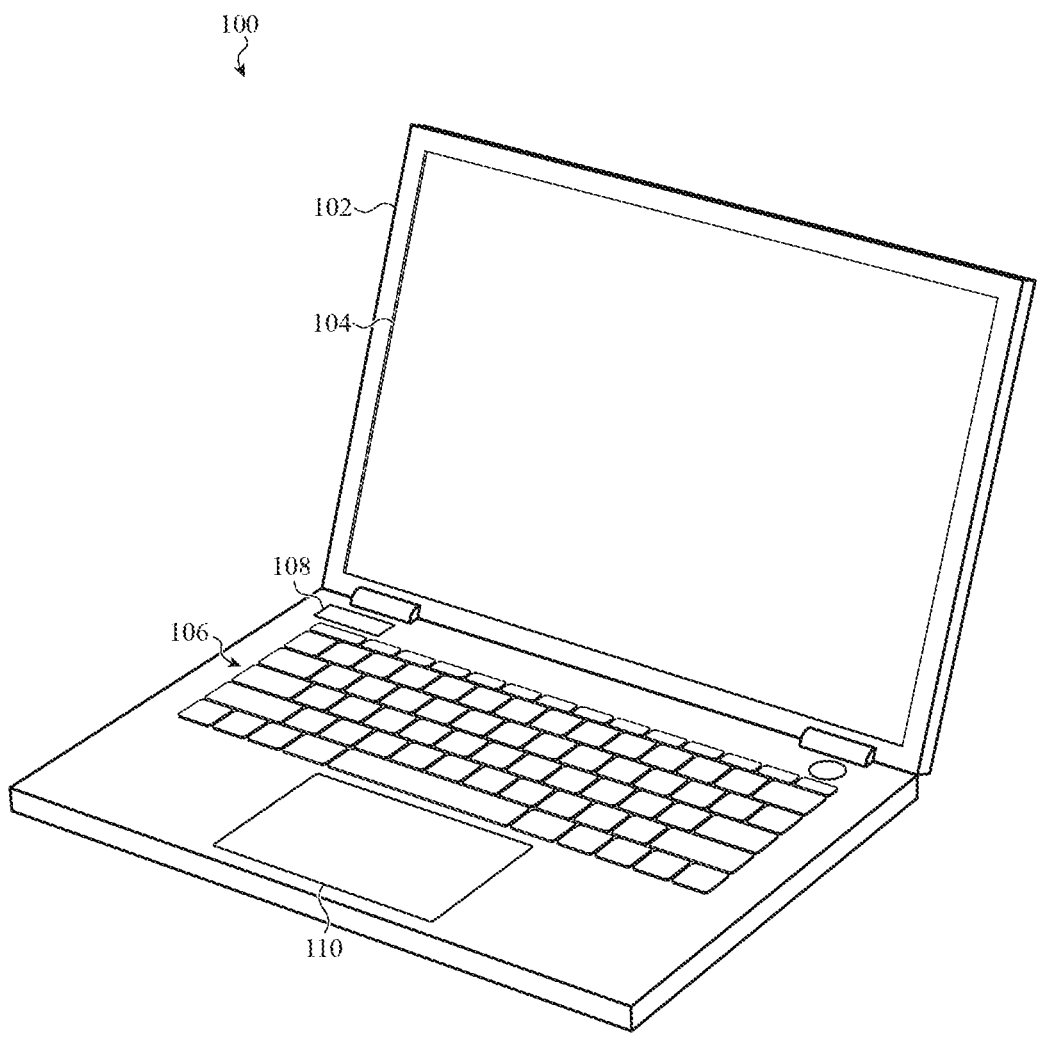
FIG. 1 depicts an electronic device that can incorporate a force input/haptic output interface, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference an electronic device that includes a force input/haptic output interface. The phrase "force input/haptic output interface," as used herein, generally references a system or set of components configured to receive force input at a surface from a user and, additionally, to provide haptic output to that same user through the same surface. The surface associated with a force input/haptic output interface (such as described herein) can be referred to as an "user interface surface."

In one example, a force input/haptic output interface is operated in conjunction with, and/or positioned over, a display of an electronic device. In this example, the user interface surface can be a protective outer cover (e.g., transparent glass, sapphire, plastic) positioned over an active display area of the display. A user can exert a force onto the protective outer cover to interact with content shown on the display at that location. In response, the force input/haptic output interface can generate a haptic output (e.g., click, vibration, shift, drop, pop, and so on) through or on the display at, or near, that location to inform the user that the force input was received. In other examples, one or more haptic outputs can be provided through the protective outer cover in response to, or independent of, one or more force inputs in a different or implementation-specific or configuration-specific manner.

In another example, a force input/haptic output interface is operated in conjunction with a user interface surface of an electronic device, such as a trackpad. In this example, the user interface surface is a continuous and planar external surface of the trackpad, which can be formed from an opaque or transparent material such as metal, glass, organic materials, synthetic materials, woven materials, and so on. A user can exert a force onto a portion of the user interface surface to instruct the electronic device to perform an action. In response, the force input/haptic output interface can generate a haptic output at, or near, that location to inform the user that the force input was received. As with other example configurations, one or more haptic outputs can be provided through the user interface surface in response to, or independent of, one or more force inputs in a different or implementation-specific or configuration-specific manner.

For simplicity of description, many embodiments that follow reference a force input/haptic output interface operated in conjunction with a non-display region of a portable electronic device, such as a trackpad region of a laptop computer. In these examples, the user interface surface is a contiguous external surface of the portable electronic device, although this may not be required. It may be appreciated, however, that this is merely one example; other configurations, implementations, and constructions are contemplated in view of the various principles and methods of operation, and alternatives thereto, described in reference to the embodiments that follow.

A force input/haptic output interface (such as described herein) can be implemented with one or more force input sensors and/or one or more haptic actuators. In some cases, a single component, referred to as a "force transducer," can be configured to provide haptic output and to receive force input. For simplicity of description, certain embodiments that follow reference a force transducer, but it may be appreciated that this is merely one example construction; other embodiments may include separate force input sensors and haptic actuators.

A force input/haptic output interface can be implemented with a set of force transducers coupled to an interior surface of an enclosure of an electronic device. Actuation of a force transducer induces a haptic output through an exterior surface of the enclosure, opposite the interior surface. Similarly, a force applied to the exterior surface of the enclosure can locally deform the interior surface. In response to the local deformation, the force transducer can generate or change a signal in a manner corresponding to the local deformation. The signal, in turn, can be correlated to a force input (e.g., a magnitude, direction, and/or location of force applied to the exterior surface).

It may be appreciated that the thickness of the enclosure separating the interior surface from the exterior surface can affect one or more characteristics of a haptic output generated and/or one or more characteristics of a force input received. More specifically, the thicker the enclosure, the more attenuated haptic outputs and force inputs may be.

In many embodiments, an enclosure of an electronic device can be formed to a structural thickness sufficient to support, enclose, and/or contain components and elements of an electronic device. An interior surface of the enclosure can be defined by regions that are thinned, stiffened, or supported in a manner that confers specific mechanical properties to those regions of the interior surface, such as greater local flexibility or greater local stiffness.

In one example, an interior surface of an enclosure includes multiple locally-flexible regions. A locally-flexible region can include one or more cavities, openings, perforations, or reduced-thickness sections that at least partially surround (or circumscribe) and define a support structure (e.g., a fixed-fixed beam having two ends, each of which are constrained). A haptic actuator, as an example of a force transducer, can be coupled to the support structure such that compression or expansion of the haptic actuator (parallel or perpendicular to the interior surface) induces a bending moment (e.g., a deformation) in the support structure which, in turn, induces a haptic output through or on the external surface of the electronic device enclosure. The degree to which the support structure bends in response to actuation of the haptic actuator may be defined or controlled, at least in part, by the geometry of the reduced-thickness sections.

For example, the thinner a reduced-thickness section is, the more the support structure within the locally-flexible region may bend or otherwise deform. In some cases, a reduced-thickness section can include one or more openings or perforations, but this may not be required of all embodiments. In many embodiments, the reduced-thickness sections have a thickness that is less than the support structure and less than the enclosure. In some examples, the support structure may have a thickness that is less than a thickness of the enclosure, but this may not be required of all embodiments. In still further embodiments, locally-flexible regions may not be required and a force transducer may be coupled directly to the interior surface of the electronic device enclosure.

In still further embodiments, the enclosure may have a substantially constant thickness. In these examples, the enclosure may be locally strengthened by a frame coupled to the interior surface of the enclosure. In this manner, regions of the interior surface of the enclosure that are not coupled to the frame may be more flexible (e.g., locally-flexible) than regions that are supported by the frame.

These and other embodiments are discussed below with reference to FIGS. 1-18. However, those skilled in the art will readily appreciate that the detailed description given herein with respect to these figures is for explanation only and should not be construed as limiting.

FIG. 1 shows an electronic device 100 that can include a force input/haptic output interface, such as described herein. As with other embodiments, the force input/haptic output interface can be configured to receive force input from a user and to provide haptic output to that same user. In some examples, the force input/haptic output interface is associated with a display of the electronic device 100. For example, the force input/haptic output interface may be positioned behind or along a perimeter of the display. In other examples, the force input/haptic output interface is associated with an input area of an enclosure the electronic device 100, such as a trackpad area adjacent to a keyboard area of an enclosure of a laptop computer.

For simplicity of description and illustration, the electronic device 100 is depicted in FIG. 1 as a laptop computer having a force input/haptic output interface integrated into a trackpad. However, it may be appreciated that this is merely one example and that other implementations of force input/haptic output interfaces can be integrated into, associated with, or take the form of different components or systems of other electronic devices including, but not limited to: desktop computers; tablet computers; cellular phones; wearable devices; peripheral devices; input devices; accessory devices; cover or case devices; industrial or residential control or automation devices; automotive or aeronautical control or automation devices; a home or building appliance; a craft or vehicle entertainment; control; and/or information system; a navigation device; and so on.

In the illustrated example, the electronic device 100 includes an enclosure 102 to retain, support, and/or enclose various electrical, mechanical, and structural components of the electronic device 100, including a primary display 104, a keyboard 106, and a secondary display 108. The enclosure 102 can be formed from, as an example, glass, sapphire, ceramic, metal, or plastic, or any combinations thereof. The electronic device 100 can also include a processor, memory, power supply and/or battery, network connections, sensors, input/output ports, acoustic elements, haptic actuators, digital and/or analog circuits for performing and/or coordinating tasks of the electronic device 100, and so on. For simplicity of illustration, the electronic device 100 is depicted in FIG. 1 without many of these elements, each of which may be included, partially and/or entirely, within the enclosure 102 and may be operationally, structurally, or functionally associated with, or coupled to, the primary display 104, the keyboard 106, the secondary display 108, and/or a force input/haptic output interface 110.

The force input/haptic output interface 110 includes a set of force transducers distributed relative to a user interface surface that may be touched by a user. In the illustrated embodiment, the user interface surface is positioned in, or projects from, a rectangular opening defined through a lower portion of the enclosure 102. In other embodiments, the user interface surface can extend across the width of the lower hinged portion of the enclosure 102. In still further embodiments, the opening and/or user interface surface can take another shape.

In the illustrated example, the user interface surface associated with the force input/haptic output interface 110 is separate from the enclosure 102. More particularly, the user interface surface is positioned in an opening defined through the enclosure 102. The opening is depicted as a rounded rectangle, but may take any suitable shape.

The user interface surface can be formed from any number of suitable materials. In some examples, the user interface surface is formed from the same material (or a similar material) as the enclosure 102, but this may not be required. For example, in one embodiment, the enclosure 102 is formed from metal and the user interface surface is formed from glass. In another example, the enclosure 102 is formed from glass and the user interface surface is formed from a ceramic material. In other examples, the user interface surface may be integrated into the enclosure 102. In many examples, the user interface surface is associated with another interface or input system of the electronic device 100, such as a touch input system.

In some cases, the user interface surface can be integrated into or otherwise be a part of the enclosure 102. In other words, an opening defined through the enclosure 102, such as shown, does not exist; the set of force transducers associated with the force input/haptic output interface 110 is coupled directly to an interior surface of the enclosure 102.

Each force transducer of the set of force transducers associated with the force input/haptic output interface 110 can be arranged relative to the user interface surface in a number of ways. For example, in some embodiments, the set of force transducers is arranged in a grid and includes four separate force transducers. In other cases, the set of force transducers contains five separate force transducers arranged in multiple, offset, rows. In some cases, each force transducer has the same shape, whereas in others certain force transducers may be larger or smaller than others. More or fewer force transducers may be use in any configuration and/or embodiment described herein.

Similarly, each force transducer associated with the force input/haptic output interface 110 can be coupled to the user interface surface in any of a number of ways. For example, in some embodiments, each force transducer is coupled directly to the user interface surface using an adhesive. In other cases, each force transducer is coupled to a substrate (e.g., a glass sheet) or frame that, in turn, is coupled to the user interface surface.

Generally and broadly, FIGS. 2A-6C depict various example constructions of a force input/haptic output interface. More specifically, these embodiments generally take the form of a force input/haptic output interface that includes haptic actuators that are coupled to locally-flexible regions defined into an interior surface of an electronic device enclosure. In these embodiments, the locally-flexible regions are each defined, at least part, by a reduced-thickness section that in turn defines a complete or partial perimeter of a support structure that is coupled to a haptic actuator. In this manner, actuation of the haptic actuator induces a bending moment and/or other deformation in the support structure.

In one example, a locally-flexible region includes two parallel rectilinear reduced-thickness sections defining a support structure between them. In this manner, the support structure takes the form of a bending beam that is fixed on two ends. In this example, the support structure has a thickness greater than that of the reduced-thickness sections, but this may not be required of all embodiments.

In another example, a locally-flexible region includes two parallel rectilinear openings or apertures defining a support structure between them. In other words, the two rectilinear openings are aligned with each other and offset from each so as to define a support structure having particular flexibility or rigidity. In this manner, the support structure takes the form of a bending beam that is fixed on two ends.

In another example, a locally-flexible region includes one reduced-thickness section that defines three edges of a rectilinear a support structure. In this manner, the support structure takes the form of a cantilevered beam that is fixed on one end.

In yet another example, a locally-flexible region includes four reduced-thickness sections arranged in a grid, defining a cross-shaped support structure between them. In yet another example, a locally-flexible region includes curved reduced-thickness sections. In yet another example, a locally-flexible region includes a number of perforations in place of a reduced-thickness section. In yet another example, a locally-flexible region includes a reduced-thickness section that entirely circumscribes a support structure. In this manner, the support structure takes the form of an island surrounded entirely by a reduced-thickness section.

Accordingly, generally and broadly, a locally-flexible region such as described herein typically includes at least one reduced-thickness section (that may be or include an aperture) that defines at least a portion of a perimeter of a beam or support structure. A haptic actuator is typically coupled to the beam or support structure.

For simplicity of description and illustration, the embodiments that follow reference one example construction of a locally-flexible region including two substantially parallel rectilinear reduced-thickness sections defining a support structure between them. It may be appreciated, however, that this is not required and a reduced-thickness section (or aperture or opening) and/or a locally-flexible region can be suitable configured differently in different embodiments.

Figure 2A:
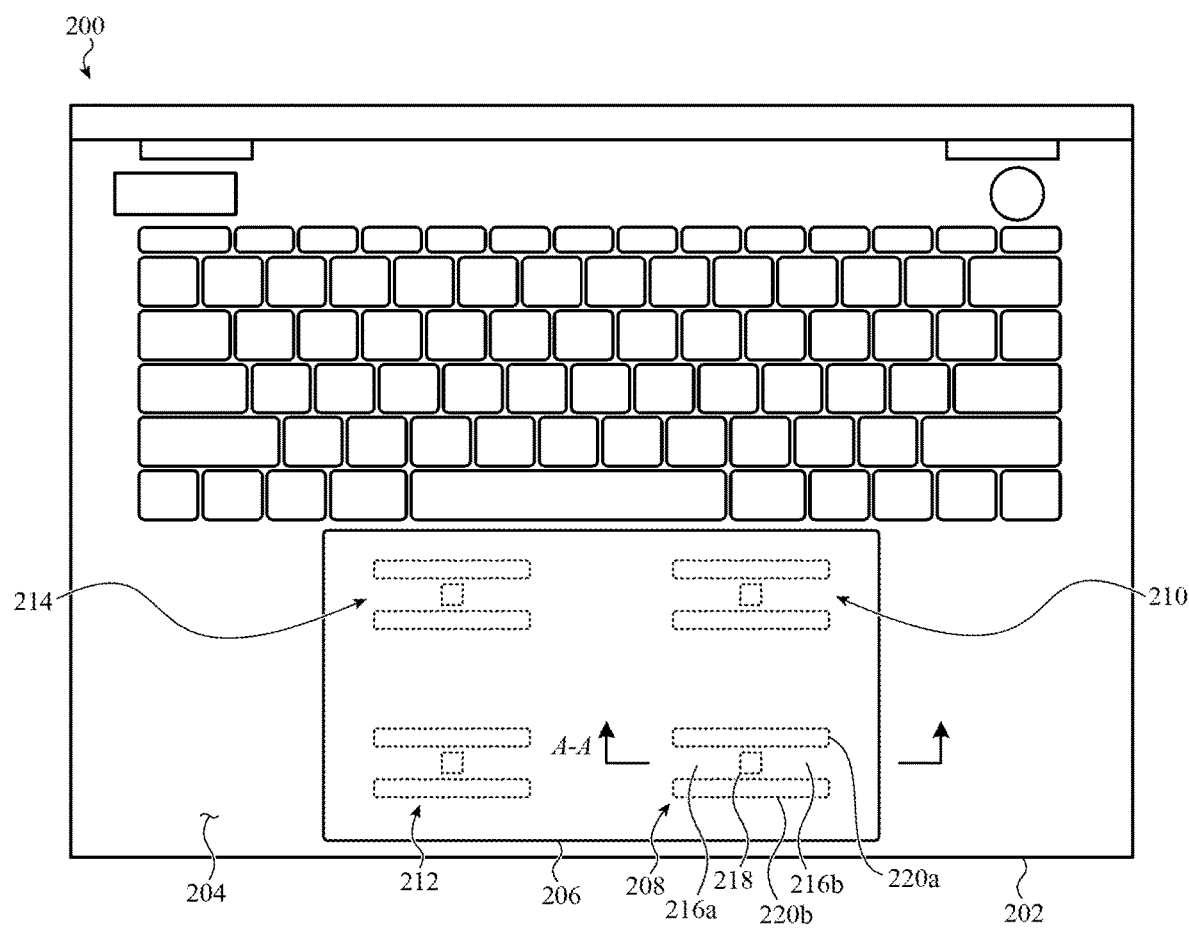
FIG. 2A depicts an example distribution of locally-flexible regions defined into an interior surface of an electronic device, such as the electronic device of FIG. 1, that may be associated with a force input/haptic output interface.

For example, FIG. 2A depicts an example distribution of locally-flexible regions formed or defined into an interior surface of an enclosure. The local-flexible regions are shown in dashed lines as these regions are not normally visible in the view depicted in FIG. 2A. The locally-flexible regions can be associated with a force input/haptic output interface incorporated into an electronic device 200. In particular, the electronic device 200 includes an enclosure 202 that defines an external surface 204. The external surface 204 may be associated with a respective interior surface of the enclosure 202. The external surface 204 may be contiguous and planar, although this is not required.

In the illustrated embodiment, the external surface 204 is shown with a region that generally extends parallel to a length of a keyboard, such as shown in FIG. 1, although this configuration is not required. In other embodiments, the external surface 204 can be configured in another manner.

For example, in other cases, the external surface 204 can be defined elsewhere, relative to the enclosure 202. For example, the external surface 204 may be associated with a portion of the enclosure 202 generally above the depicted keyboard (as used herein terms such as "above" and "below" are relative to a typical orientation of an electronic device, such as the electronic device 200, when in use). In other cases, the external surface 204 may be below the enclosure 202, on an underside of the electronic device. In still other cases, the external surface 204 may be defined in a sidewall or edge of the enclosure 202. It may be appreciated that the external surface 204, associated with the force input/haptic output interface, can be suitable configured in or incorporated into any suitable surface of the enclosure 202.

In this embodiment, the external surface 204 defines an opening to accommodate a user interface surface 206, which may be formed from a different material than the external surface 204. The opening is aligned approximately in the center of the first region (e.g., a lower region) of the external surface 204 and extends approximately half a width of the lower region.

In the illustrated embodiment, four locally-flexible regions 208, 210, 212, 214 are illustrated in phantom and defined into the interior surface of the enclosure 202. The four locally-flexible regions are distributed in a two-by-two grid.

The four locally-flexible regions are typically configured and constructed in the same manner, but this is not required. For example, in some embodiments, the locally-flexible region 208 and the locally-flexible region 210 are configured as a first pair of locally-flexible regions sharing one or more flexibility or rigidity properties, whereas the locally-flexible region 212 and the locally-flexible region 214 are configured as a second pair of locally-flexible regions sharing one or more flexibility or rigidity properties that are different than the properties of the first pair. For simplicity of description, the description that follows references the locally-flexible region 208; it is appreciated that the locally-flexible regions 210, 212, and 214 may be similarly configured.

Turning to FIGS. 2B-2E, the locally-flexible region 208 defines a support structure 216 to support a haptic actuator 218, such as a piezoelectric element. The support structure 216 is bordered by two reduced-thickness sections, identified as the reduced-thickness sections 220a and 220b. The reduced-thickness sections 220a and 220b have a thickness less than that of the enclosure 202 and less than that of the support structure 216. The reduced-thickness sections 220a and 220b can be formed into the interior surface of the enclosure 202 in any suitable manner including, but not limited to: ablation; etching; stamping; scribing; and so on. In some examples, the reduced-thickness sections 220a and 220b include one or more apertures or perforations (not shown). The interior surface of the enclosure 202 is identified in FIGS. 2B-2C as the interior surface 222.

Figure 2B:
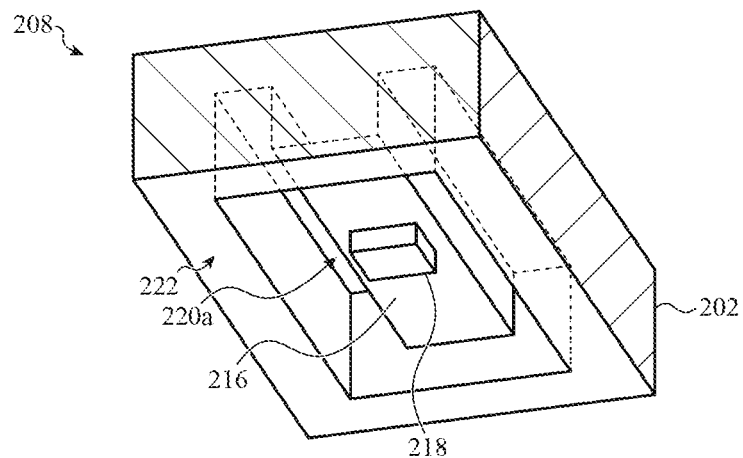
FIG. 2B depicts a locally-flexible region of the enclosure depicted in FIG. 2A.
Figure 2C:
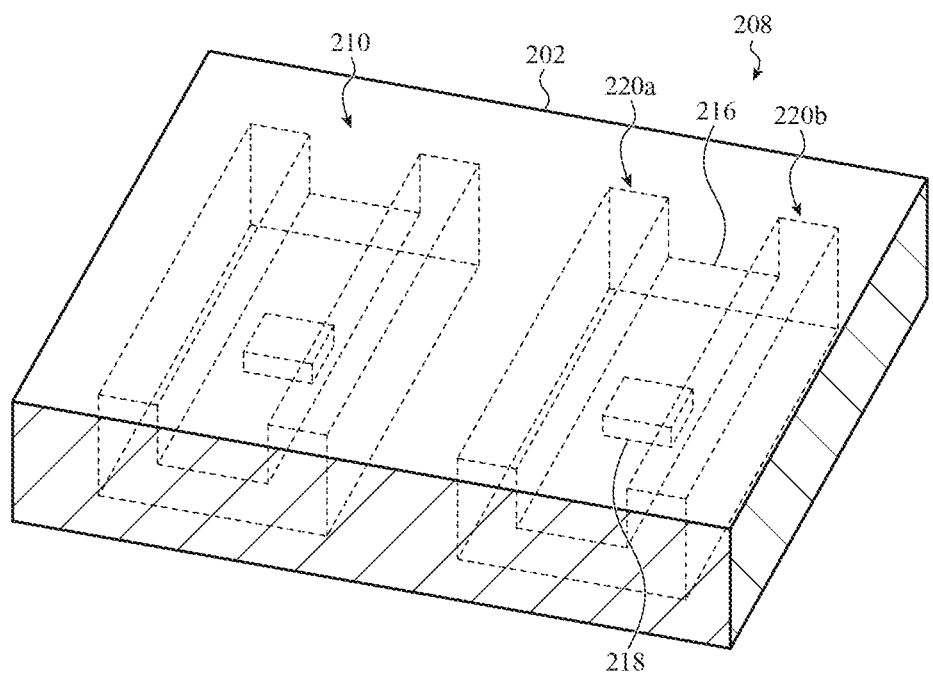
FIG. 2C depicts another view of the locally-flexible region depicted in FIG. 2B.
Figure 2D:
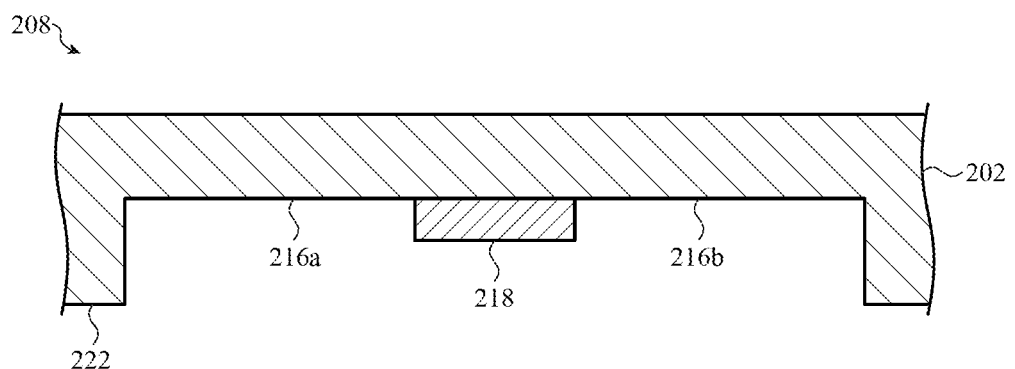
FIG. 2D depicts a locally-flexible region of the enclosure depicted in FIG. 2A, taken through line A-A.

In the illustrated example, and as shown in FIGS. 2B-2C, the support structure 216 is a rectilinear bending beam with two fixed ends, a first end 216a and a second end 216b. (see, e.g., FIG. 2A and FIGS. 2D-2E). However, this is merely one example. In other embodiments, the support structure 216 can take any number of suitable shapes including, but not limited to: a cross shape; a circular shape; a curved shape; a spoke-and-hub shape; and so on.

In some cases, the support structure 216 can have a thickness that is less than that of the enclosure 202 and/or the user interface surface 206, although this may not be required. For example, as illustrated (see FIGS. 2B-2C), the support structure 216 has a thickness less than that of the enclosure 202.

Figure 2E:
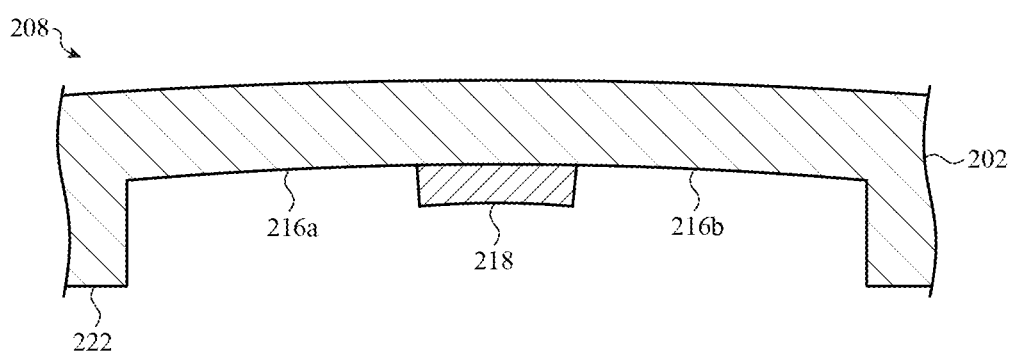
FIG. 2E depicts the locally-flexible region of the enclosure depicted in FIG. 2D, showing flexion of the locally-flexible region.

As a result of this construction, compression or expansion of the haptic actuator 218 in a direction parallel to the user interface surface 206 induces a bending moment, deforming either toward the user interface surface 206 or toward an interior volume within the enclosure 202, in the support structure 216. FIG. 2E depicts an outward deformation of the user interface surface 206 as a result of a compression of the haptic actuator 208. More specifically, parallel compression of the haptic actuator 208 (e.g., parallel to the user interface surface 206) results in perpendicular deformation of the user interface surface 206. In other cases, the user interface surface 206 may deform inwardly. In still other embodiments, the user interface surface 206 may deform both outwardly and inwardly (e.g., oscillation or vibration).

Figure 2F:
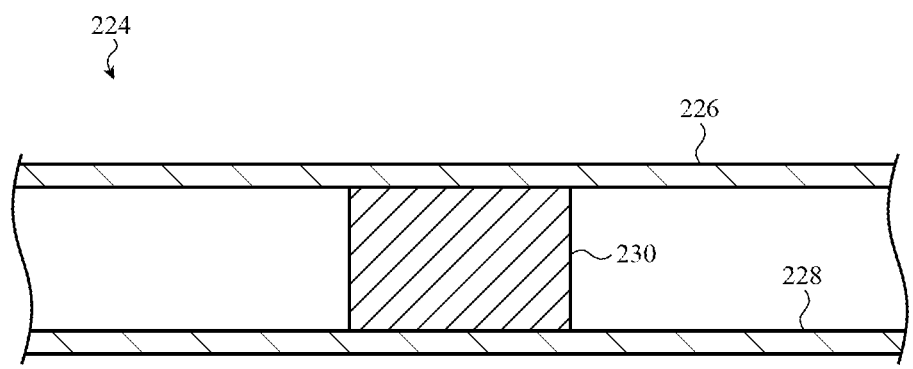
FIG. 2F depicts another example locally-flexible region of an enclosure, such as depicted in FIG. 2A.

In another example, the haptic actuator 218 can compress or expand in a direction perpendicular to the user interface surface 206. For example, as illustrated in FIG. 2F, an enclosure 224 can include a locally-flexible region 226 of an external user interface surface. The locally-flexible region 226 can be positioned opposite an internal frame 228. A haptic actuator 230 is positioned between the internal frame 228 and the locally-flexible region 224.

Figure 2G:
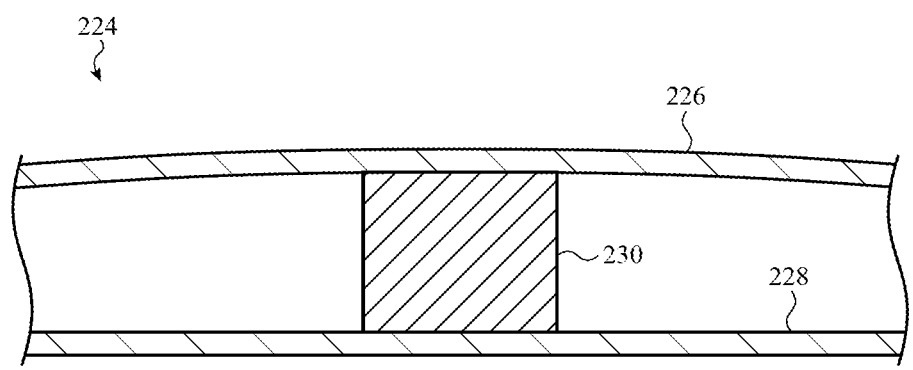
FIG. 2G depicts the locally-flexible region of the enclosure depicted in FIG. 2F, showing flexion of the locally-flexible region.

As a result of this construction, compression or expansion of the haptic actuator 230 in a direction perpendicular to the locally-flexible region 226 induces a bending moment, deforming the locally-flexible region 226 either outward or, alternatively, toward an interior volume within the enclosure 224, in the support structure 216. FIG. 2G depicts an outward deformation of the locally-flexible region 226 as a result of an expansion of the haptic actuator 230. More specifically, perpendicular expansion of the haptic actuator 230 (e.g., perpendicular to the locally-flexible region 226) results in perpendicular deformation of the locally-flexible region 226. In other cases, the locally-flexible region 226 may deform inwardly. In still other embodiments, the locally-flexible region 226 may deform both outwardly and inwardly (e.g., oscillation or vibration).

Figure 3:
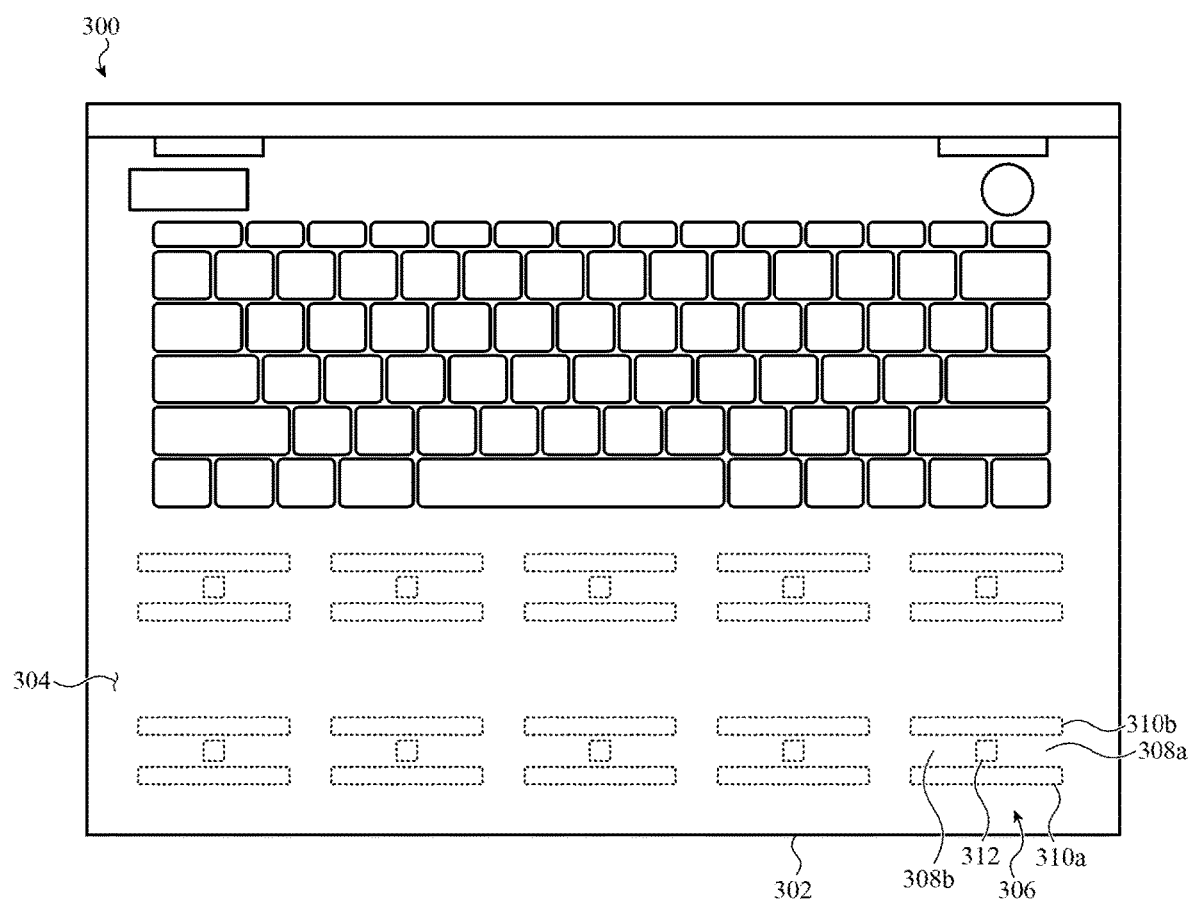
FIG. 3 depicts another example distribution of locally-flexible regions associated with a force input/haptic output interface.

Other embodiments can be implemented in another manner. For example, FIG. 3 depicts another example distribution of force transducers, each associated with a respective locally-flexible region defined into an interior surface of the enclosure, and that can be associated with a force input/ haptic output interface incorporated into an electronic device 300. In particular, the electronic device 300 includes an enclosure 302 that defines an external surface 304. The external surface 304 defines an upper region and a lower region. In this embodiment, the external surface 304 defines the user interface surface; no opening or separate layer to define the interface is required. In this manner, the visual continuity of the external surface 304 is not interrupted. The locally-flexible regions can be formed into an interior surface of the enclosure 302 below the lower region of the external surface 304.

In the illustrated embodiment, the interior surface of the enclosure 302 defines ten locally-flexible regions associated with ten force transducers, arranged in two parallel rows (e.g., each local-flexible region positioned in a selected location). One of the force transducers is labeled as the force transducer 306. As with other embodiments described herein, the force transducer 306 is coupled to a locally-flexible region defined into the interior surface of the enclosure 302. In some embodiments, the locally-flexible region is defined into or defined by a frame coupled to the interior surface of the enclosure 302.

In the illustrated example, the frame includes reduced-thickness sections that cooperate to define a rectilinear bending beam (identified as the support structure 308) having two fixed ends, identified as the fixed ends 308a and 308b. In the illustrated embodiment, the reduced-thickness sections are identified as the reduced-thickness sections 310a and 310b. In this manner, the frame defines locally-flexible region similar to the local-flexible regions referenced with respect to other embodiments described herein.

A piezoelectric element 312 is positioned on the support structure 308. In other embodiments, the support structure 308 can take any number of suitable shapes including, but not limited to: a cross shape, a circular shape, a curved shape, a spoke-and-hub shape, and so on.

As a result of the depicted construction, compression or expansion of the piezoelectric element 318 induces a bending moment within the support structure 308, either toward the external surface 304 of the enclosure 302 or toward an interior volume within the enclosure 302.

Figure 4:
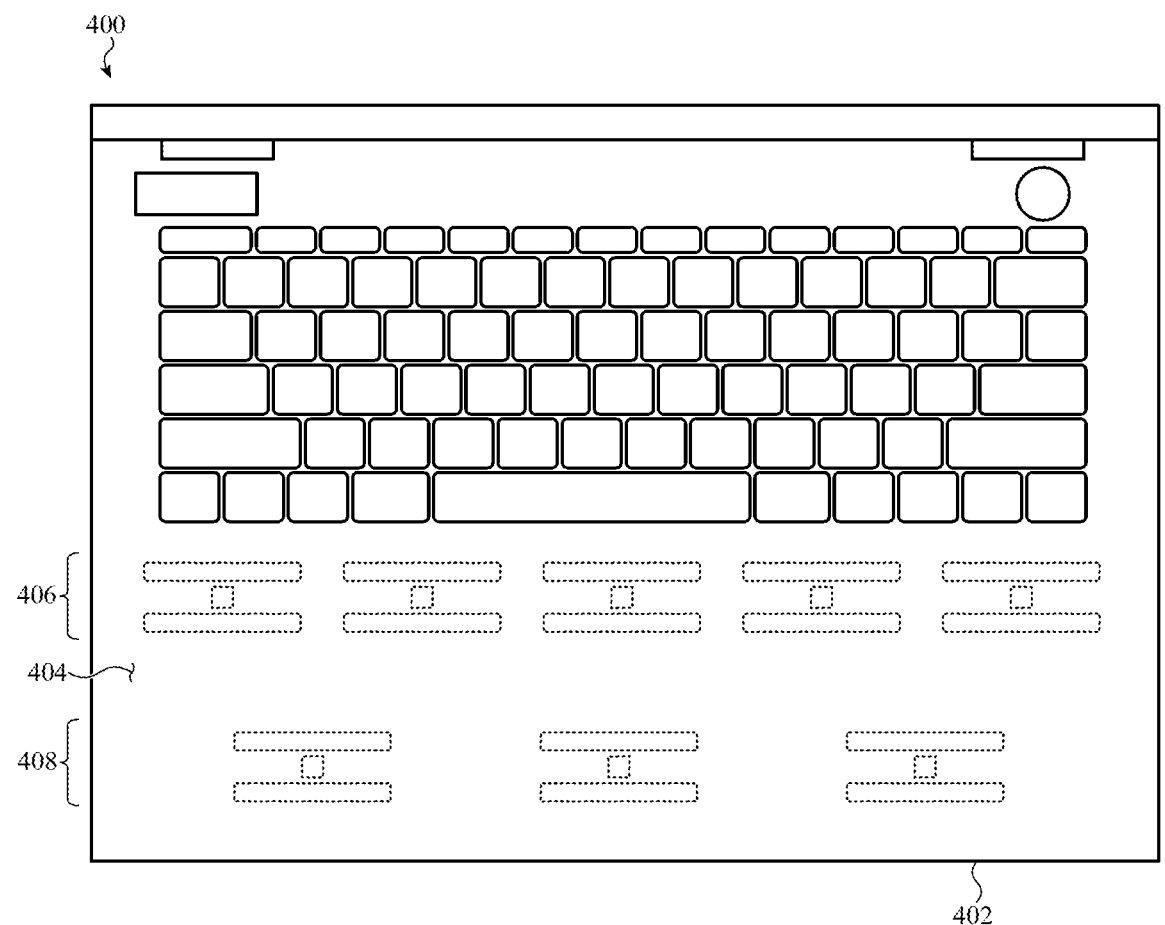
FIG. 4 depicts another example distribution of locally-flexible regions associated with a force input/haptic output interface.

Still further embodiments can be implemented in another manner. For example, FIG. 4 depicts an electronic device 400 that includes another example distribution of force transducers that can be associated with a force input/haptic output interface. In particular, the electronic device 400 includes an enclosure 402 that defines a user interface surface 404 that extends across an entirety of a width of a lower portion of the enclosure 402, substantially parallel to a length of a keyboard positioned in an upper portion of the enclosure 402.

In the illustrated embodiment, the interior surface of the enclosure 402 includes two parallel rows of locally-flexible regions, identified as the upper row 406 and the lower row 408. In this example, the lower row 408 can include locally-flexible regions that have different mechanical properties than the locally-flexible regions of the upper row 406. In particular, the locally-flexible regions of the lower row 408 may be more rigid (e.g., smaller in area) than the locally-flexible region of the upper row 406.

Figure 5:
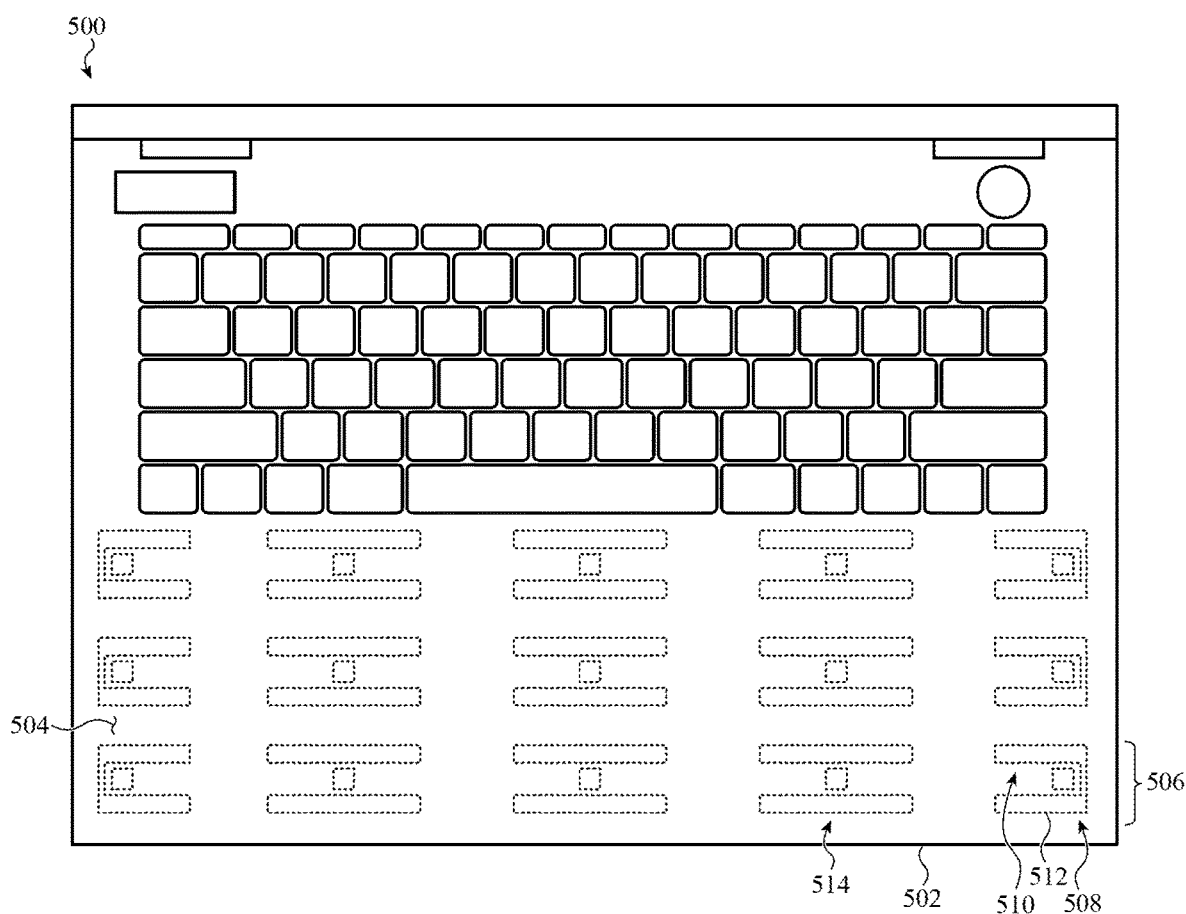
FIG. 5 depicts another example distribution of locally-flexible regions associated with a force input/haptic output interface.

Still other configurations and constructions may be implemented. For example, FIG. 5 depicts an electronic device 500 with another example distribution of force transducers. The electronic device 500 includes an enclosure 502 that defines a user interface surface 504. In the illustrated embodiment, a set of locally-flexible regions defined into the internal surface of the enclosure 502 supports a number of force transducers, arranged in three parallel rows, one of which is identified as the row 506.

As noted above with respect to other embodiments, the locally-flexible regions are typically configured and constructed in the same manner, but this is not required. For example, in some embodiments, the row 506 may include a locally-flexible region that exhibit different mechanical properties. For example, a first locally-flexible region 508 may include with a cantilevered 510 (e.g., a cantilevered beam) that is defined by a reduced-thickness section 512. A second locally-flexible region 514 may be associated with a pair of reduced-thickness sections that cooperate to define a rectilinear bending beam having two fixed ends, such as described with respect to other embodiments herein.

In this example, each row of force transducers includes the same number of force transducers, but configuration this is not required. For example, in some embodiments, different rows of force transducers may include a different number or arrangement of force transducers.

The foregoing embodiments depicted in FIGS. 2A-5 and the various alternatives thereof and variations thereto are presented, generally, for purposes of explanation, and to facilitate an understanding of various configurations of a force input/haptic output interface and the various components thereof, such as described herein. However, it will be apparent to one skilled in the art that some of the specific details presented herein may not be required in order to practice a particular described embodiment, or an equivalent thereof.

For example, it may be understood that, generally and broadly, embodiments described herein can arrange any suitable number of force transducers in any number of suitable patterns including, but not limited to: grid patterns; column-and-row patterns; alternating patterns; repeating patterns; tessellated patterns; offset patterns; and so on. Further, it may be appreciated that in certain examples, locally-flexible regions may be included to define or modify particular load paths through a frame supporting the various force transducers or an interior surface of an electronic device enclosure that supports the various force transducers. In other embodiments, the locally-flexible regions are associated with reduced-thickness sections (e.g., formed by abrasion, ablation, etching, molding, and so on).

Further, it may be understood that, although the foregoing embodiments reference force transducers implemented with piezoelectric elements, this configuration is not required. In other embodiments, other electroactive elements, materials, or constructions may be used. Suitable materials and constructions may include, without limitation: electroactive polymers; shape-change or memory-wire (e.g., nitinol); ferroelectric polymers; microelectromechanical systems; magnetic attractors; linear actuators; solenoid-based systems; and so on.

Further, in many examples, the support structures depicted and described in reference to FIGS. 2A-5 may not share a uniform thickness with adjacent portions of the interior surface of an electronic device enclosure. For example, FIGS. 6A-6C generally and broadly depict cross-sections of an example force transducer coupled to a locally-flexible region, such as a frame or an interior surface of an electronic device enclosure.

Figure 6A:
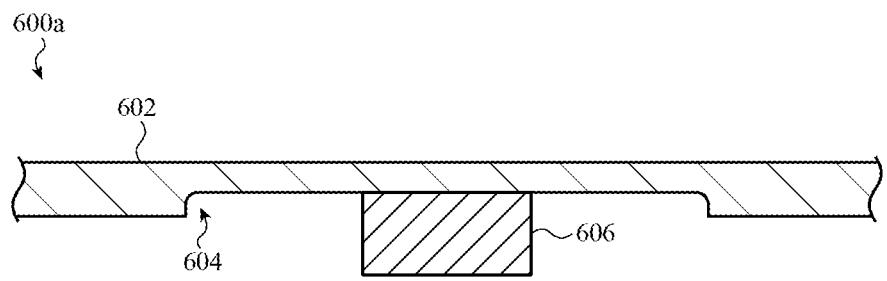
FIG. 6A depicts a cross-section of an example force transducer coupled to a locally-flexible region of an interior surface of an electronic device enclosure, such as described herein.

In particular, FIG. 6A depicts a cross-section of an example force transducer 600*a* coupled to a locally-flexible region 602 of an enclosure, such as described herein. The cross-section is taken through line A-A of FIG. 2A, and shows an embodiment different than that of FIGS. 2B-2E. The locally-flexible region 602 includes a relieved section 604 that forms a support structure. The relieved section 604 has a thickness less than that of portions of the locally-flexible region 602 adjacent to the relieved section 604.

The relieved section 604 can be formed in any number of suitable ways. For example, the relieved section 604 can be formed by laser ablation, mechanical etching, chemical etching, or any combination thereof. A piezoelectric element 606 is coupled to the relieved section 604 such that compression or expansion of the piezoelectric element 606 induces a bending moment in the relieved section 604. Similarly, bending of the relieved section 604 can result in a concentration of compression or tension in the piezoelectric element 606.

Figure 6B:
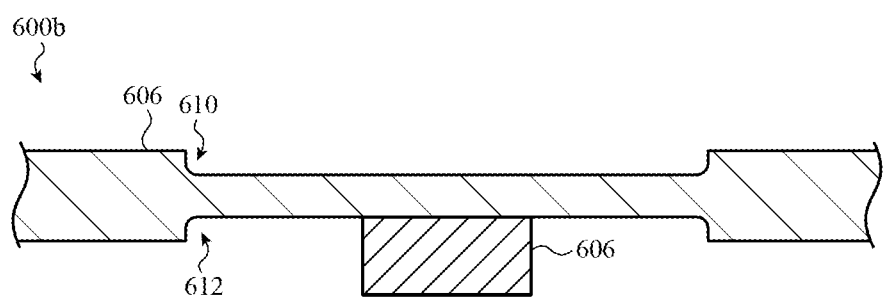
FIG. 6B depicts a cross-section of another example force transducer coupled to a locally-flexible region of an interior surface of an electronic device enclosure, such as described herein.

FIG. 6B depicts a cross-section of an example force transducer 600*b* coupled to a locally-flexible region 602, such as described herein. The locally-flexible region 602 includes a first relieved section 610 opposite a second relieved section 612 (e.g., different surface of an enclosure). More specifically, the first relived section 610 may be defined into an external surface of a housing and the second relived section may be defined into an internal surface of the housing. The combination of the first relived section 610 and the second relieved section 612 results in a thickness less than that of portions of the locally-flexible region 602 adjacent to those sections.

The relieved sections can be formed, and may function, as described with respect to other embodiments described herein (e.g., FIGS. 2A-5).

Although illustrated as opposite one another, one may appreciate that the first relieved section 610 and the second relieved section 612 need not be symmetrically formed. For example, in some embodiments, the second relieved section 612 may be wider than the first relieved section 610. In other cases, the second relieved section 612 may only partially overlap the first relieved section 610.

Figure 6C:
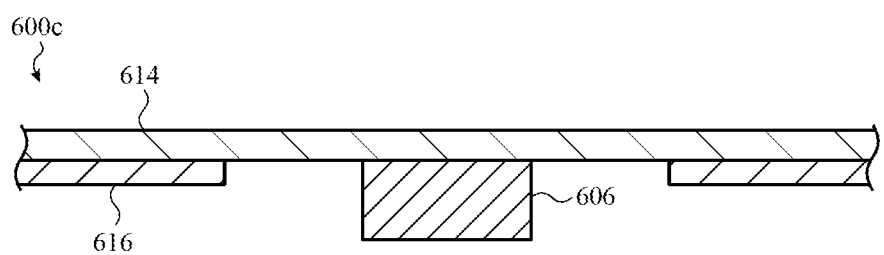
FIG. 6C depicts a cross-section of another example force transducer coupled to a locally-flexible region of an interior surface of an electronic device enclosure, such as described herein.

In still further embodiments, a locally-flexible region can be formed by stiffening or supporting one substrate layer (e.g., an outer layer of an electronic device enclosure) with a second substrate layer. For example, FIG. 6C depicts a cross-section of another example force transducer coupled to a locally-flexible region. The locally-flexible region 600*c* is defined by a substrate layer 614 that is strengthened by a backing plate 616. In some embodiments, the backing plate can be referred to as a "frame" that provides mechanical support to the substrate layer 614. The backing plate 616 increases the thickness of certain portions of the substrate layer 614. In this manner, a relieved section is formed. The relieved section is coupled to a piezoelectric element 606, as with previously-discussed embodiments.

The foregoing embodiments depicted in FIGS. 6A-6C and the various alternatives thereof and variations thereto are presented, generally, for purposes of explanation, and to facilitate an understanding of various constructions and distributions of force transducers (and, correspondingly, force input sensors and haptic output elements) and the various components thereof, such as described herein. However, it will be apparent to one skilled in the art that some of the specific details presented herein may not be required in order to practice a particular described embodiment, or an equivalent thereof.

Figure 7:
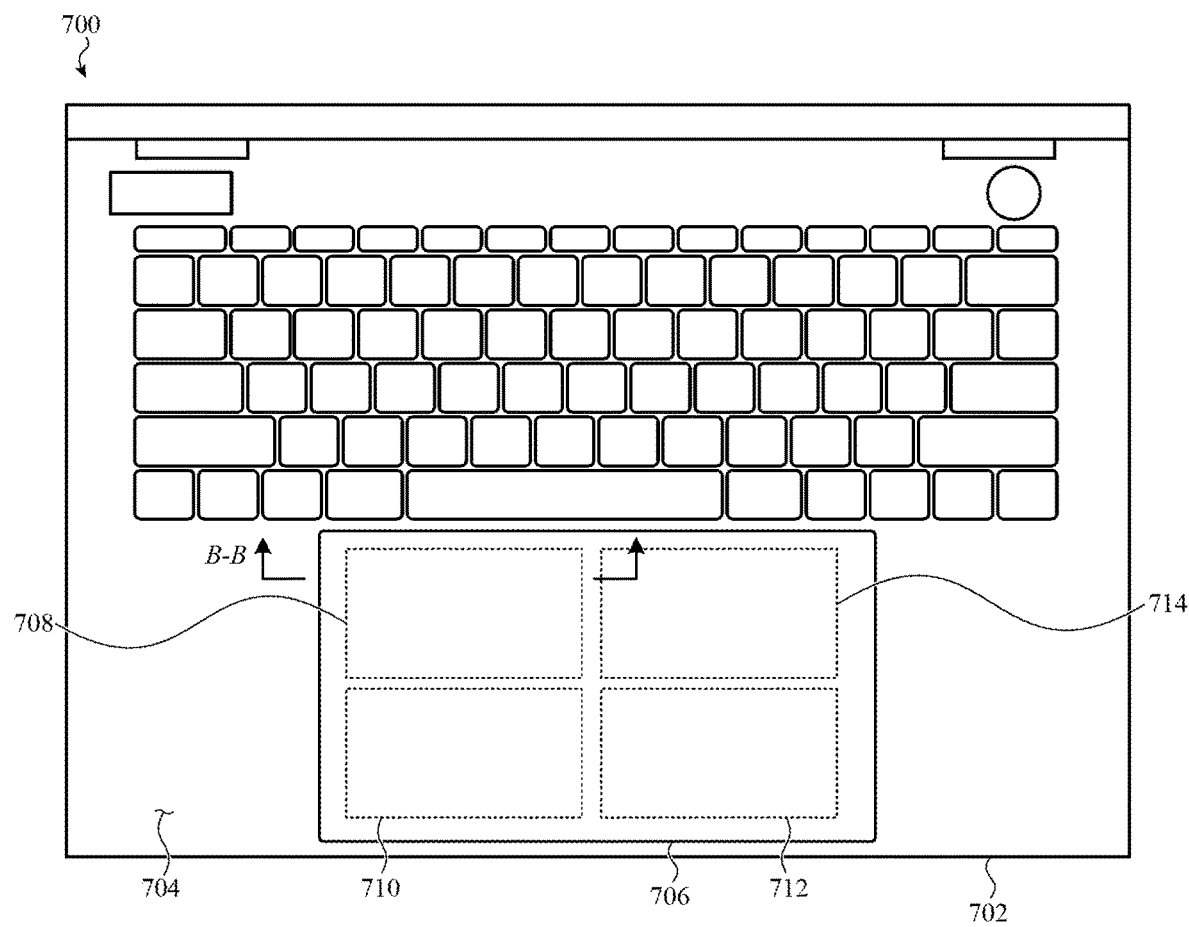
FIG. 7 depicts another example distribution of locally-flexible regions associated with a force input/haptic output interface, such as described herein.
Figure 8:
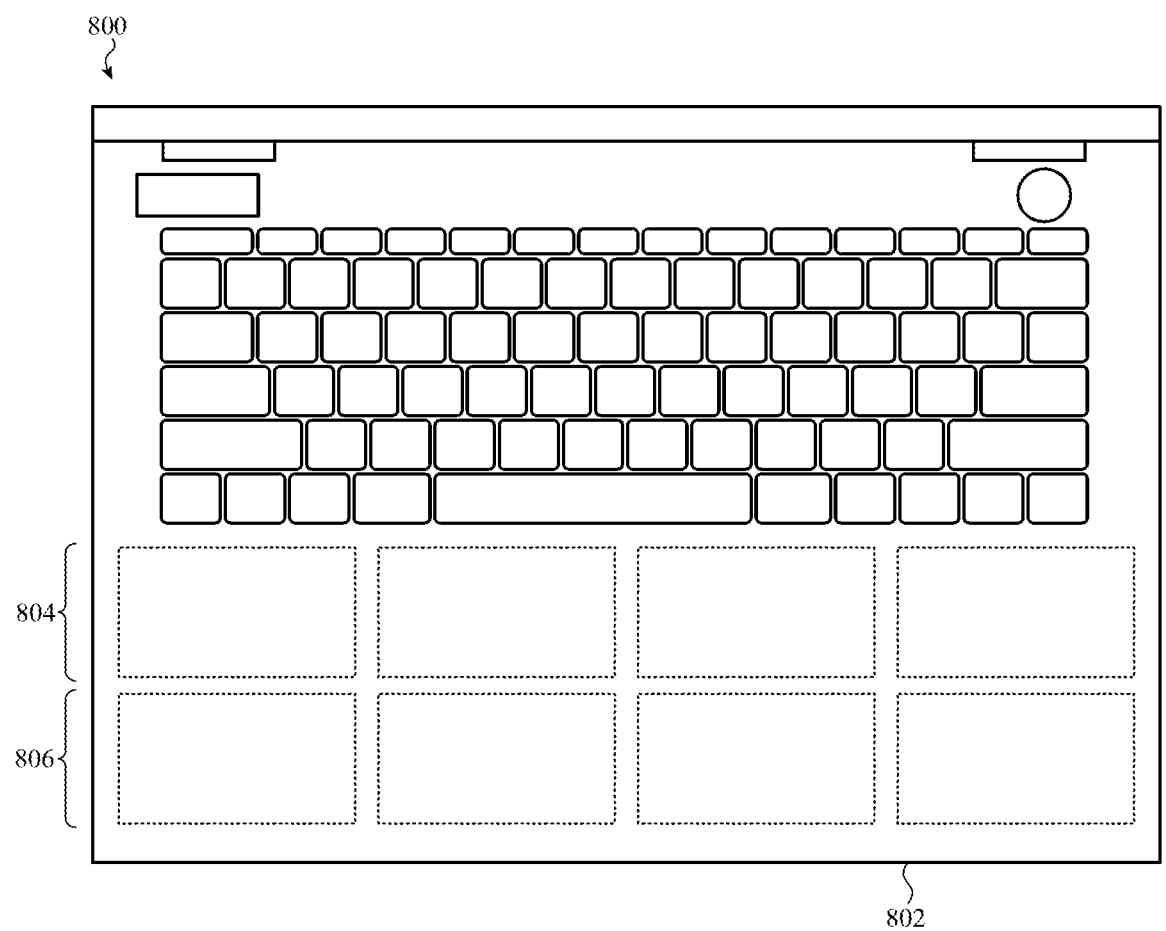
FIG. 8 depicts another example distribution of locally-flexible regions associated with a force input/haptic output interface, such as described herein.

Generally and broadly, FIGS. 7-8 depict various example constructions of a force input/haptic output interface. Each depicts a different example arrangement of force transducers relative to a user interface surface.

For example, FIG. 7 depicts an example distribution of force transducers that can be associated with a force input/haptic output interface incorporated into an electronic device 700. In particular, the electronic device 700 includes an enclosure 702 that defines an external surface 704. In this embodiment, as with the embodiment depicted in FIG. 2, the external surface 704 defines an opening to accommodate a user interface substrate 706. In some examples, the user interface substrate 706 and the external surface 704 may be flush, but this may not be required of all embodiments. For example, in some implementations, the user interface substrate 706 protrudes from the external surface 704.

In some embodiments, the user interface substrate 706 can be coupled to a frame (not shown) that is disposed within the enclosure 702. The frame can be made from any number of suitable materials including metals, plastics, glasses, and so on. In one example, the frame is coupled (e.g., via fasteners, adhesive, and so on) to an internal surface of the enclosure 702.

In the illustrated embodiment, the frame supports four force transducers 708, 710, 712, and 714. The four force transducers are arranged in a two-by-two grid.

The four force transducers are typically configured and constructed in the same manner, but this is not required. For example, in some embodiments, the force transducer 708 and the force transducer 710 are configured as a first pair of transducers sharing one or more properties whereas the force transducer 712 and the force transducer 714 are configured as a second pair of transducers sharing one or more properties different than the properties of the first pair. For simplicity of description, the description that follows references the force transducer 708; it is appreciated that the force transducers 710, 712, and 714 may be similarly configured.

The force transducer 708 is formed from a piezoelectric material having a crystalline structure that mechanically distorts when an electric field is applied to it. Suitable materials can include lead zirconate titante and potassium sodium niobate. In other examples, the force transducer 708 can be formed from an electroactive polymer, an electromagnetic coil and a ferromagnetic or magnetic plate, or an any combination thereof.

As a result of this construction, compression or expansion of the force transducer 708 induces a deformation in the user interface substrate 706. Similarly, a compression of the suspended of the user interface substrate 706 induces a compression of the force transducer 708.

In other embodiments, one or more force transducers of a force input/haptic output interface can be distributed in a different manner. For example, FIG. 8 depicts another sample force input/haptic output interface incorporated into an electronic device 800. In particular, the electronic device 800 includes an enclosure 802 that includes two rows of force transducers (or haptic actuators or force input sensors), identified as the upper row 804 and the lower row 806. The upper row 804 and the lower row 806 are coupled to an interior surface of the enclosure, generally below a keyboard. The two rows, as illustrated, each include four force transducers.

The foregoing embodiments depicted in FIGS. 7-8 and the various alternatives thereof and variations thereto are presented, generally, for purposes of explanation, and to facilitate an understanding of various alternative configurations of a force and the various components thereof, such as described herein. However, it will be apparent to one skilled in the art that some of the specific details presented herein may not be required in order to practice a particular described embodiment, or an equivalent thereof.

For example, it may be understood that, generally and broadly, embodiments described herein can arrange any suitable number of force transducers in any number of suitable patterns including, but not limited to: grid patterns; column-and-row patterns; alternating patterns; repeating patterns; tessellated patterns; offset patterns, and so on.

Further, it may be understood that although the foregoing embodiments reference force transducers implemented with piezoelectric elements, this configuration is not required; in other embodiments, other electroactive elements, materials, or constructions may be used. Suitable materials and constructions may include, without limitation: electroactive polymers; shape-change or memory-wire (e.g., nitinol); ferroelectric polymers; microelectromechanical systems; magnetic attractors; linear actuators; solenoid-based systems; and so on.

Figure 9:
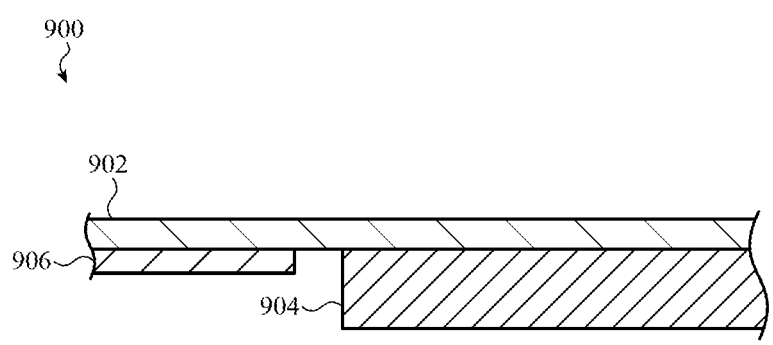
FIG. 9 depicts a cross-section of an example force transducer coupled to a locally-flexible region of an interior surface of an electronic device enclosure, such as described herein.

Further, as with other embodiments described herein, the force transducers depicted and described in reference to FIGS. 7-8 may not share a uniform thickness with adjacent portions of the frame or the interior surface of an electronic device enclosure. For example, a locally-flexible region can be formed by stiffening or supporting one substrate layer with a second substrate layer. For example, FIG. 9 depicts a cross-section taken through line B-B of FIG. 7, showing another example force transducer coupled to a locally-flexible region. The locally-flexible region 900 is defined by a substrate layer 902 that can couple to a force transducer 904. The substrate layer 902 is strengthened by a backing plate 906. The backing plate 906 increases the thickness of certain portions of the substrate layer 902, thereby forming a relieved section 908.

In further examples, a force input/haptic output interface can be integrated within an electronic device in another manner. For example, as noted above, a force input/haptic output interface may be implemented in conjunction with a touch input sensor. FIGS. 10-14 depict examples of such configurations.

Figure 10:
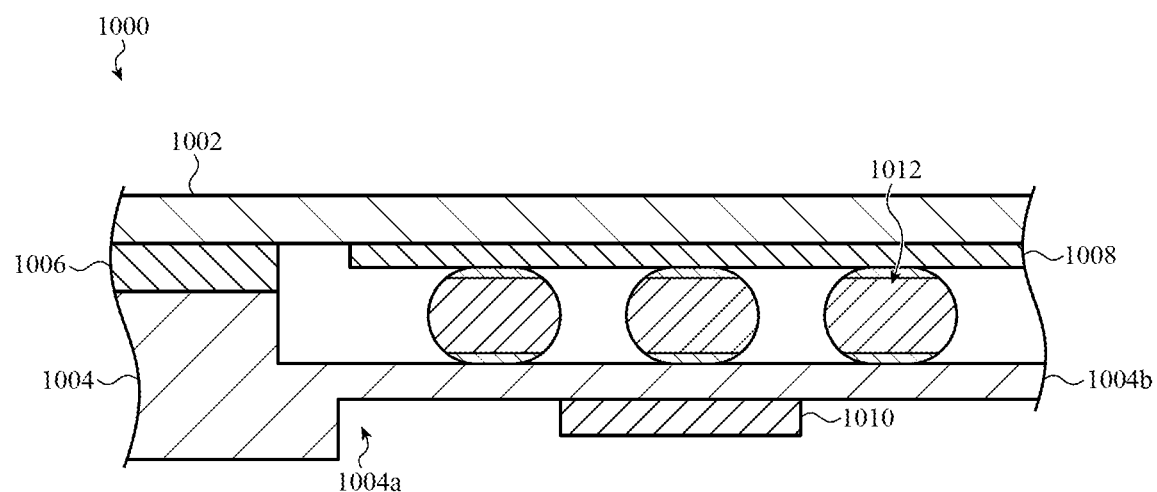
FIG. 10 depicts a cross-section of another example force transducer coupled to a locally-flexible region of an interior surface of an electronic device enclosure, such as described herein.

For example, FIG. 10 depicts a cross-section (e.g., taken through line B-B of FIG. 7, showing a different embodiment than that of FIG. 9) of an example force input/haptic output interface. In this example, the force input/haptic output interface 1000 includes a force input sensor and a haptic output element.

The force input/haptic output interface 1000 is associated with an external cover 1002 that defines an input surface to receive user input (e.g., force and touch) and to provide haptic output. The external cover 1002 is positioned over and coupled to a frame 1004 via a compressible seal 1006. The compressible seal 1006 can provide relief to the external cover 1002 when a user applies a force to the external cover 1002. In other cases, the compressible seal 1006 provides an environmental or hermetic seal to protect one or more components internal to the force input/haptic output interface 1000. In the illustrated example, a touch input sensor 1008 is disposed on an interior surface of the external cover 1002.

The force input/haptic output interface 1000 also includes a haptic actuator 1010 that is coupled to a reduced-thickness section of the frame 1004, identified as the reduced-thickness section 1004a. More specifically, the haptic actuator 1010 is coupled to a lower surface of the reduced-thickness section 1004a. As with other embodiments described herein, the haptic actuator 1010 can include a piezoelectric element.

The frame 1004 can be configured to provide mechanical support to one or more portions of the force input/haptic output interface 1000. In other examples, the frame 1004 can provide a means of coupling the external cover 1002 to functional portions of the force input/haptic output interface 1000. More specifically, the frame 1004 can include one or more surfaces configured to adhere to one or more surfaces of the external cover 1002.

The material or construction of the frame 1004 may be selected at least in part to provide a particular haptic output in response to a compression or deformation of the haptic actuator 1010. For example, a thickness of the frame 1004 can influence one or more characteristics of a haptic output generated by the haptic actuator 1010 that is coupled to that frame; a thicker frame may result in attenuation of low frequency outputs from the haptic actuator 1010 whereas a thinner frame may result in attenuation of high frequency outputs from the haptic actuator 1010.

Similarly, the material of the frame 1004 can influence one or more characteristics of a haptic output generated by the haptic actuator 1010 that is coupled to that frame. For example, an aluminum frame may result in a different haptic output than a copper frame, a plastic frame, or a glass frame.

In many embodiments, the frame 1004 is formed from a different material than the external cover 1002. For example, the frame 1004 can be formed from metal and the external cover 1002 can be formed from glass.

The force input/haptic output interface 1000 also includes a capacitive force sensor 1012. The capacitive force sensor 1012 can be defined by two or more electrical contacts separated by a flexible material such as, but not limited to: silicone; plastic; glass; gel; and so on. In some cases, the flexible material of the capacitive force sensor 1012 may have a non-Newtonian response such that when the frame 1004 deforms in response to an actuation of the haptic actuator 1010, the deformation of the frame 1004 is rigidly translated to the external cover 1002.

The flexible material of the capacitive force sensor 1012 need not be continuous; in the illustrated example, the flexible material is implemented as three separate flexible dot elements, but this is not required. As a result of this construction, when a force is applied (e.g., by a user) to the external cover 1002, the flexible material of the capacitive force sensor 1012 can compress, reducing the distance between the two or more electrical contacts and changing the capacitance of the capacitive force sensor 1012. This change in capacitance can be measured by a controller (that can include drive circuitry, sense circuitry, and the like) coupled to or otherwise in electrical communication with the capacitive force sensor 1012, which in turn, can correlate the capacitance change (or absolute capacitance) to a magnitude of force applied by the user to the external cover 1002. In still further examples, the capacitive force sensor 1012 can provide mechanical relief to the external cover 1002.

In this example, the haptic actuator 1010 can be configured to provide haptic output to a user and the force sensor 1012 can be configured to receive force input from the same user.

Figure 11:
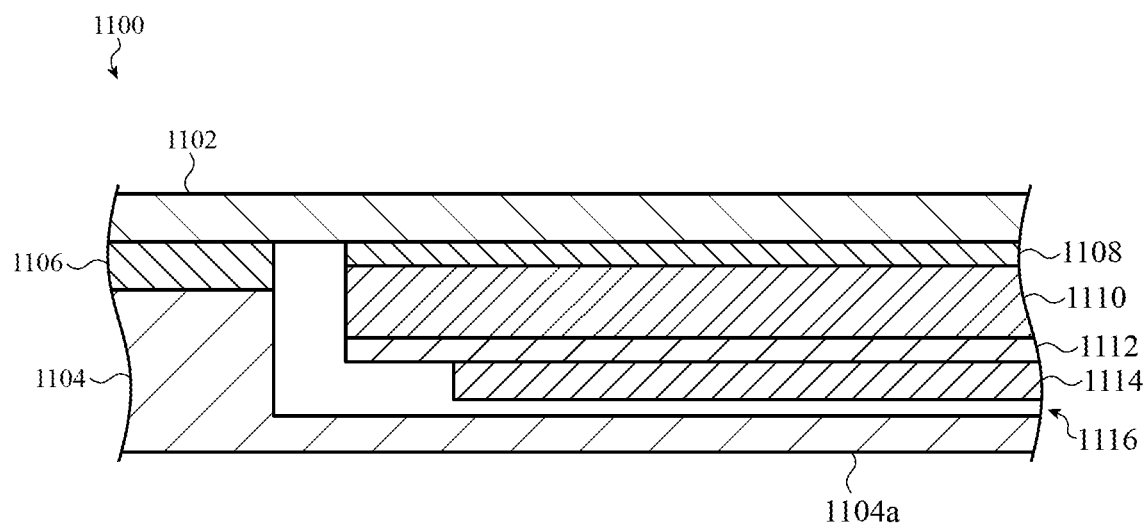
FIG. 11 depicts a cross-section of another example force transducer and locally-flexible region of an interior surface of an electronic device enclosure, such as described herein.

In another embodiment, the force input/haptic output interface can be implemented in a different manner. For example, FIG. 11 depicts a cross-section of a force input/haptic output interface 1100, such as described herein. In this embodiment, the force input/haptic output interface 1000 includes a touch input sensor, a force input sensor, and a haptic output element. In this example, the haptic output element is positioned below the force input sensor.

As with other embodiments described herein, the force input/haptic output interface includes an external cover 1102 that defines an input surface to receive user input and to provide haptic output. The external cover 1102 is positioned over and coupled to a frame 1104 via a compressible seal 1106, that may be configured and function similarly to compressible seals described in reference to other embodiments herein. A touch input sensor 1108 is disposed on an interior surface of the external cover 1102. The touch input sensor 1108 can be implemented as a capacitive touch sensor.

As with other embodiments described herein, the force input/haptic output interface 1100 also includes a capacitive force sensor 1110. The capacitive force sensor 1110 can be defined by two electrical contacts separated by a flexible material such as, but not limited to: silicone, plastic, glass, gel, and so on. The flexible material need not be continuous; in the illustrated example, the flexible material is implemented as a flexible contiguous layer, but this is not required.

The force input/haptic output interface 1100 also includes a stiffener 1112 below the capacitive force sensor 1110. The stiffener 1112 can be configured and can function similar to stiffeners and backing plates described herein. In particular, the stiffener 1112 may define locally-flexible and/or locally-stiffened regions of the force input/haptic output interface 1100.

A haptic output element 1114 is positioned below the stiffener 1112. The haptic output element 1114 is separated from the frame 1104 by a gap 1116. The gap 1116 is configured to permit the force input/haptic output interface 1100 to flex in response to a force applied by a user or a haptic output generated by the haptic output element 1114. In other examples, the gap 1116 can be larger or smaller. The gap 1116 may have a uniform or non-uniform thickness. In some cases, the gap 1116 can be filled with a filler material such as, but not limited to: compressible foam; compressible adhesive; compressible liquid; and so on. In other cases, the gap 1116 may be filled with a gas such as air.

Figure 12:
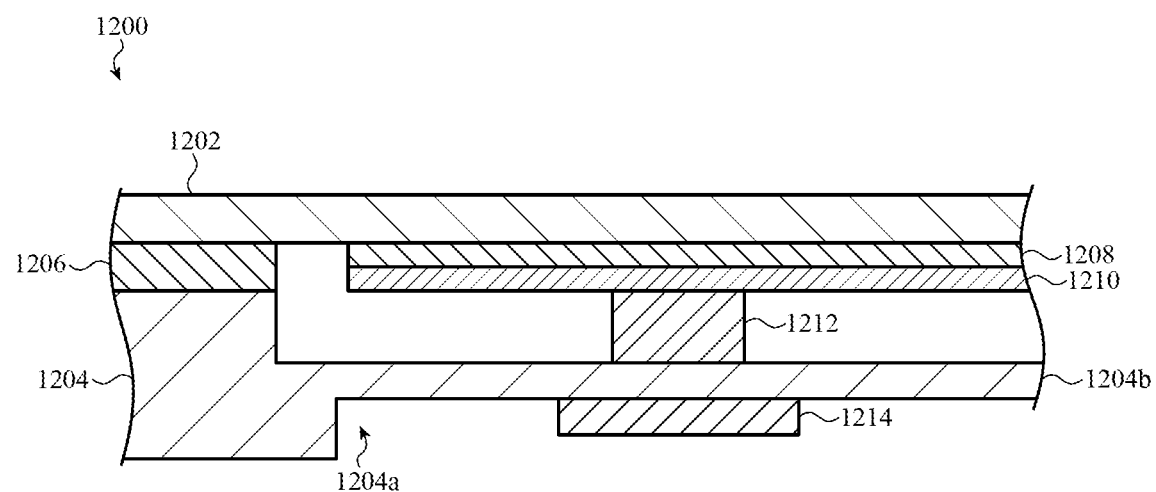
FIG. 12 depicts a cross-section of another example force transducer and locally-flexible region of an interior surface of an electronic device enclosure, such as described herein.

FIG. 12 depicts a cross-section of another example force transducer coupled to a substrate associated with a force input/haptic output interface 1200, such as described herein. The force input/haptic output interface includes an external cover 1202 that defines an input surface to receive user input and to provide haptic output. The external cover 1202 is positioned over and coupled to a frame 1204 via a compressible seal 1206. As with other embodiments described herein, a touch input sensor 1208 is disposed below an interior surface of the external cover 1202. In this example, a haptic actuator (described in greater detail below) is coupled below the frame 1204.

In the illustrated embodiment, a force input sensor 1210 is disposed below the touch input sensor 1208 of the external cover 1202, such that the force input sensor 1210 experiences strain in proportion to a magnitude of force applied to the external cover 1202.

The force input sensor 1210 can be constructed in any number of suitable ways. For example, in one embodiment, the force input sensor 1210 is implemented as a piezoelectric sheet configured to compress or expand—and generate a charge measureable as a voltage spike—in response to a force applied to the external cover 1202. In another embodiment, the force input sensor 1210 is implemented as a strain sensor. A strain sensor be formed from one or more traces of peizoresistive material. In another example, a strain sensor can be an inductive strain sensor configured to exhibit a change in inductance proportional to or otherwise related to a strain experienced by the external cover 1202 in response to a force applied to the external cover 1202.

The force input sensor 1210 is offset from the frame 1204, and thereby able to flex, by a separator 1212 (e.g., a spacer). The separator 1212 can be formed from any number of suitable elastic or otherwise flexible materials such as, but not limited to: silicone; plastic; glass; gel; a pressure-sensitive adhesive; and so on. In other cases, the separator 1212 may not be flexible and can be formed form a material such as metal or rigid plastic. In these examples, local or global flexibility of the frame 1204 and/or flexibility of the compressible seal 1206 may provide relief for the force input/haptic output interface 1200 in response to a force input from the user.

In this example, the frame includes a reduced-thickness section 1204a. As with other embodiments described herein, the reduced-thickness section 1204a can at least partially defined a locally-flexible region of the frame 1204. The force input/haptic output interface 1200 also includes a haptic actuator 1214 that is coupled to a reduced-thickness section 1204a of the frame 1204. As with other embodiments described herein, the haptic actuator 1214 can include a piezoelectric element.

As a result of the constructed depicted in FIG. 12, high-voltage electronics that may be required to actuate the haptic actuator 1214 may be physically and structurally isolated from low-voltage electronics that may be required to operate the touch input sensor 1208 and/or the force input sensor 1210. Further, in some examples, the frame 1204 may be formed from metal. In these examples, the frame 1204 may provide electromagnetic shielding between the haptic actuator 1214 and the force input sensor 1210 and/or the touch input sensor 1208. As a result of these constructions, a total thickness of the force input/haptic output interface 1200 can be reduced.

Figure 13:
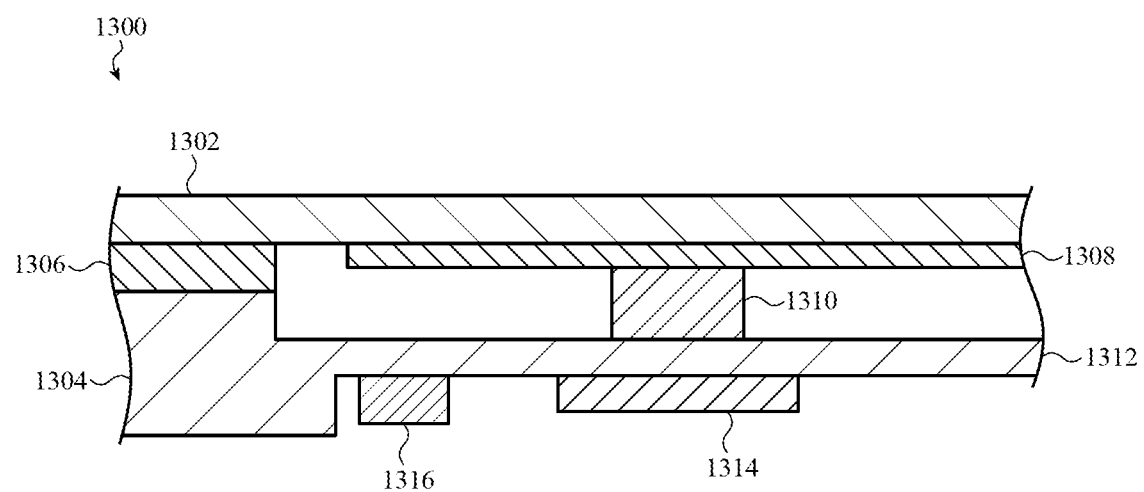
FIG. 13 depicts a cross-section of another example force transducer and locally-flexible region of an interior surface of an electronic device enclosure, such as described herein.

FIG. 13 depicts a cross-section of another example force transducer coupled to a substrate associated with a force input/haptic output interface 1300, such as described herein. The force input/haptic output interface 1300 is configured similar to other embodiments (e.g., FIG. 12) described herein. In this example, a force input sensor is coupled to a locally-flexible portion of a frame. The locally-flexible portion of the frame concentrates strain in the force input sensor, thereby increasing the sensitivity of that sensor.

In particular, the force input/haptic output interface 1300 includes an external cover 1302 positioned over a frame 1304 and a compressible seal 1306. A touch input sensor 1308 is disposed below the external cover 1302, and is separated from a locally-flexible portion 1312 the frame 1304 by a separator 1310. A haptic actuator 1314 is coupled to a lower surface of the locally-flexible portion 1312. The force input/haptic output interface 1300 also includes a force input sensor 1316 that is coupled to the locally-flexible portion 1312. The force input sensor 1316 can be constructed in any number of suitable ways, such as those described in reference to FIG. 12. In this example, as with FIG. 12, electronics associated with the haptic actuator 1314 are physically and structurally isolated from those associated with the touch input sensor 1308.

Figure 14:
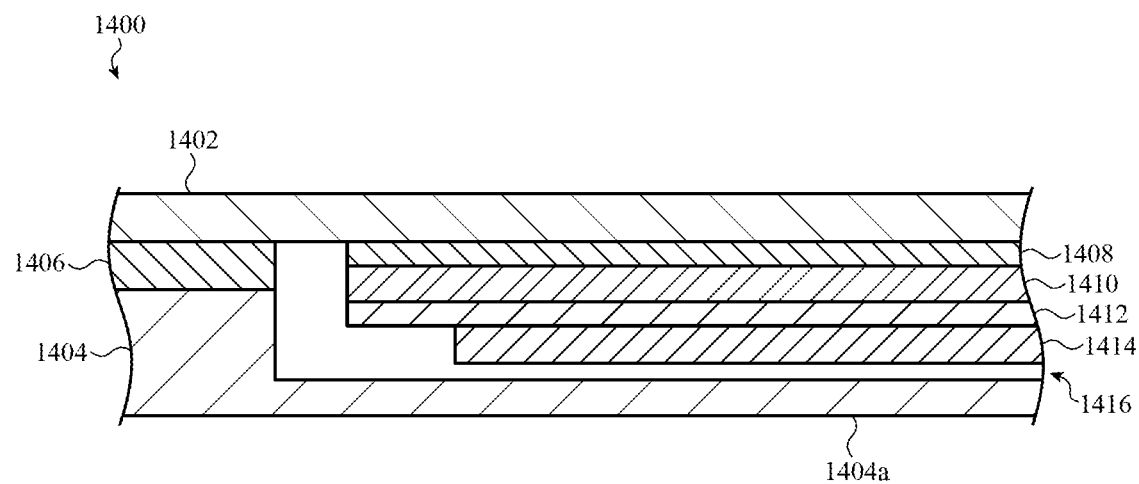
FIG. 14 depicts a cross-section of another example force transducer and locally-flexible region of an interior surface of an electronic device enclosure, such as described herein.

In yet another embodiment, a force input sensor and a haptic actuator can be laminated in a single stack below an input surface. FIG. 14 depicts a force input/haptic output interface includes an external cover 1402 coupled to the frame 1404 via a compressible seal 1406. A touch input sensor 1408 is coupled to an interior surface of the external cover 1402. A force input sensor 1410 is disposed below the touch input sensor 1408 of the external cover 1402. In this example, the force input sensor 1410 is backed by a stiffener 1412. In typical embodiments the stiffener 1412 is formed from a rigid material such as metal, but this may not be required. In other examples, the stiffener 1412 is formed from plastic or glass. In some cases, the stiffener 1412 is formed from metal so as to electromagnetically shield the touch input sensor 1408.

The force input/haptic output interface 1400 also includes a haptic actuator 1414 that is coupled to a lower side of the stiffener 1412. The haptic actuator 1414 is separated from a reduced-thickness section 1404a of the frame 1404 by a gap 1416. The gap 1416 permits the stack depicted in FIG. 14 to deform toward the frame 1404 in response to a user input. As with other embodiments described herein, the haptic actuator 1414 can include a piezoelectric element.

Figure 15:
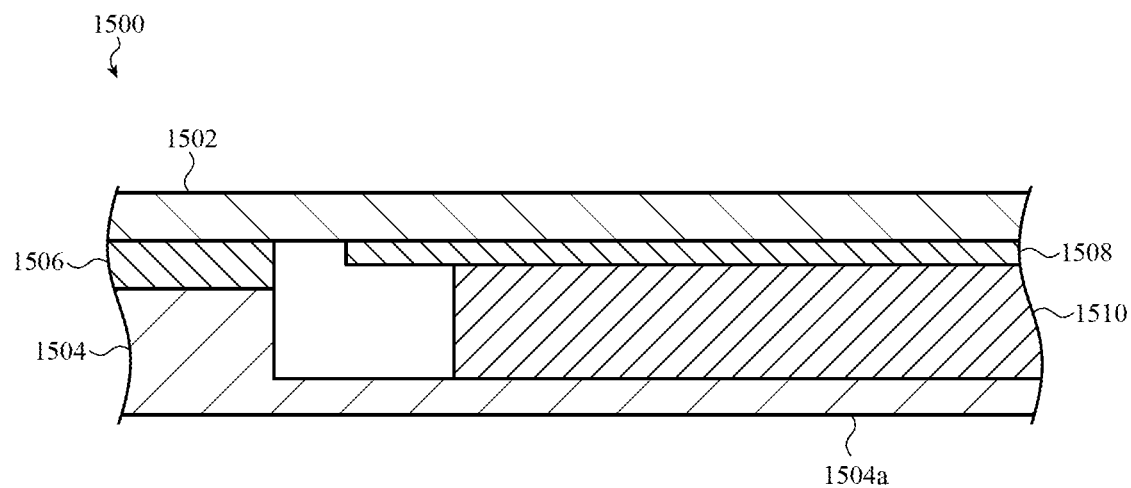
FIG. 15 depicts a cross-section of another example force transducer and locally-flexible region of an interior surface of an electronic device enclosure, such as described herein.

Many examples provided above include haptic actuators configured to compress or expand in a direction parallel to a user input surface. However, this may not be required. For example, FIG. 15 depicts a force input/haptic output interface 1500 that includes an external cover 1502 coupled to the frame 1504 via a compressible seal 1506. As with other embodiments, a touch input sensor 1508 is coupled to an interior surface of the external cover 1502. A force input sensor (not shown) can be disposed below the touch input sensor 1508 of the external cover 1502, or in any suitable location.

The force input/haptic output interface 1500 also includes a haptic actuator 1510 that is coupled between the frame 1504 and the touch input sensor 1508. As a result of this construction, expansion or compression of the haptic actuator 1510 perpendicular to the external cover 1502 results in outward or inward expansion of the external cover 1502. As with other embodiments described herein, the haptic actuator 1510 can be any suitable haptic actuator such as a piezoelectric actuator, an electroactive polymer actuator, a linear actuator, and so on.

The foregoing embodiments depicted in FIGS. 10-15 and the various alternatives thereof and variations thereto are presented, generally, for purposes of explanation, and to facilitate an understanding of various configurations of a force input/haptic output interface and the various components thereof, such as described herein. However, it will be apparent to one skilled in the art that some of the specific details presented herein may not be required in order to practice a particular described embodiment, or an equivalent thereof.

For example, it may be understood that, generally and broadly, embodiments described herein can arrange various components of a force input/haptic output interface in any suitable order. For example, a force input sensor can be positioned: above, below, or adjacent to a touch input sensor; above, below, or adjacent to a haptic output element; above, below, or adjacent to a frame; above, below, or adjacent to a reduced-thickness section of a frame; above, below, or adjacent to a cover; and so on. Similarly, a haptic output element can be positioned: above, below, or adjacent to a touch input sensor; above, below, or adjacent to a force input sensor; above, below, or adjacent to a frame; above, below, or adjacent to a reduced-thickness section of a frame; above, below, or adjacent to a cover; and so on. Similarly, a force transducer configured to provide both haptic output and configured to receive force input from a user can be positioned: above, below, or adjacent to a touch input sensor;

above, below, or adjacent to a frame; above, below, or adjacent to a reduced-thickness section of a frame; above, below, or adjacent to a cover; and so on.

Figure 16:
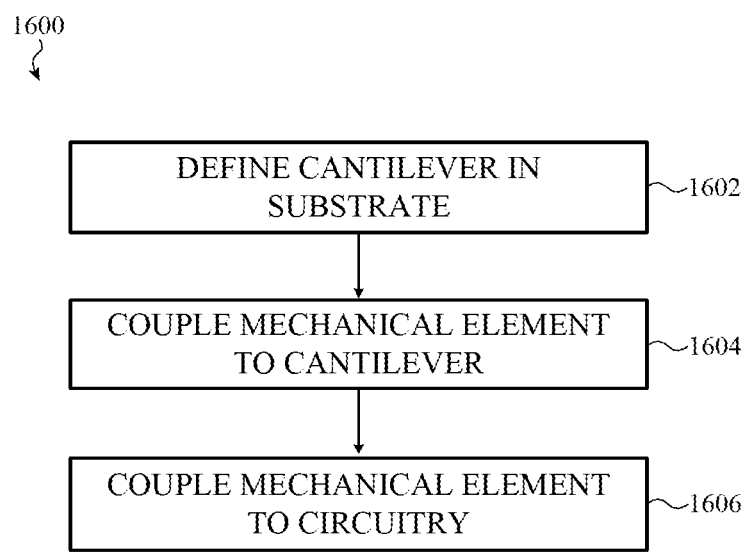
FIG. 16 is a flow chart depicting example operations of a method of forming a haptic actuator, such as described herein.
Figure 17:
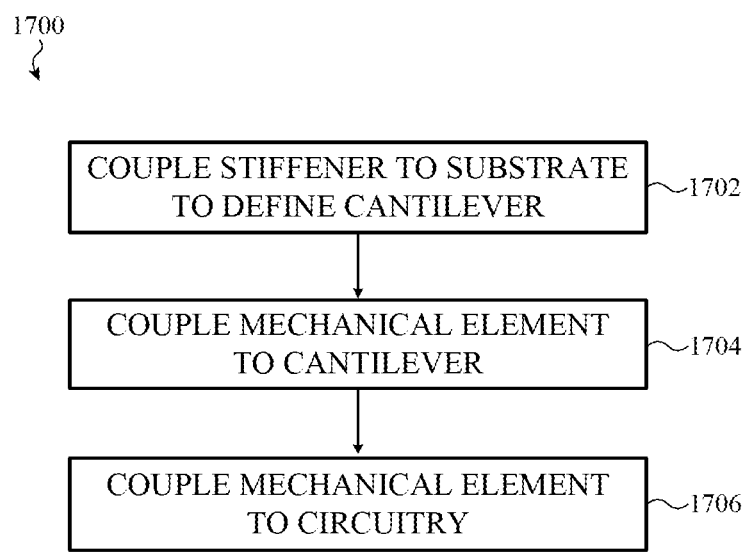
FIG. 17 is a flow chart depicting example operations of a method of providing haptic feedback.
Figure 18:
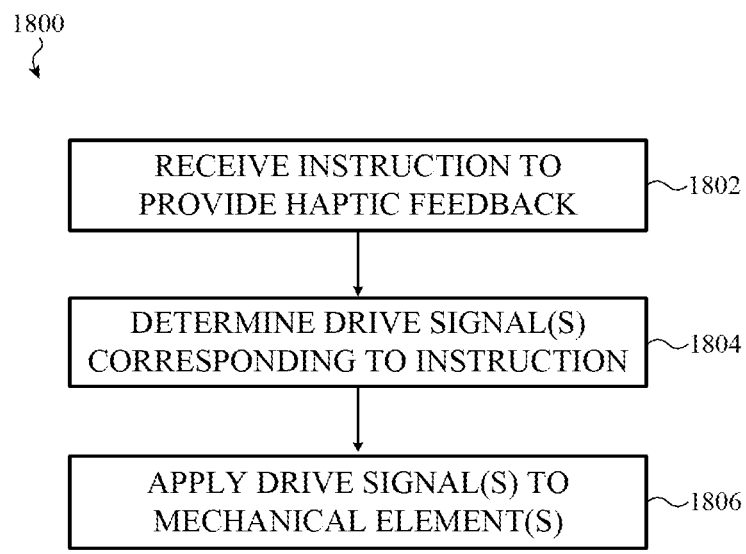
FIG. 18 is a flow chart depicting example operations of a method of receiving force input.

Generally and broadly, FIGS. 16-18 depict flow charts that correspond to various methods that may be associated with a force input/haptic output interface, such as described above.

FIG. 16 is a flow chart depicting example operations of a method of forming a haptic actuator, such as described herein. The method 1600 begins at operation 1602 in which a reduced-thickness section is formed in or through a substrate. The reduced-thickness section can be formed in any manner including, but not limited to: ablation; abrasion; etching; punching; cutting; and so on. In some cases, the reduced-thickness section can be formed and/or introduced into the substrate while forming the substrate (e.g., molding). In some cases, the reduced-thickness section can be formed by adding material to the substrate adjacent to the region.

The thickness of the substrate can be changed to any suitable thickness relative to adjacent portions of the substrate. In some cases, the reduced-thickness section is an opening. In other cases, the reduced-thickness section has a uniform thickness, whereas in others, the thickness of the reduced-thickness section varies. The reduced-thickness section can take any number of suitable shapes.

Next, at operation 1604, a force transducer is coupled adjacent to the reduced-thickness section. In some cases, the force transducer is coupled directly to the reduced-thickness section. In other cases, the force transducer is coupled directly to the reduced thickness region.

Next, at operation 1606, the force transducer can be coupled to drive circuitry and/or sense circuitry. In many cases, the drive circuitry and the sense circuitry are implemented as different portions of a single controller in electrical communication or otherwise coupled to the force transducer.

FIG. 17 is a flow chart depicting example operations of another method of forming a haptic actuator, such as described herein. The method 1700 beings at operation 1702 in which an instruction to provide haptic feedback is received. In typical embodiments, the instruction is received by a controller in signal communication with a set of force transducers or haptic actuators.

At operation 1704, a set or subset of haptic actuators of a set of haptic actuators (or force transducers) is selected. In some cases, a single haptic actuator can be selected. In other cases, more than one haptic actuator can be selected. In still further embodiments, all haptic actuators of a set of haptic actuators can be selected.

At operation 1706, the set or subset of haptic actuators of the set of haptic actuators selected at operation 1704 can be actuated or driven by a controller or drive circuitry. In some cases, a drive signal corresponding to each individual selected haptic actuator can be applied to the respective haptic actuator. In some cases, the drive signal(s) applied to each haptic actuator are the same, whereas in others the drive signal(s) may be unique to each haptic actuator of the set or subset of haptic actuators of the set of haptic actuators selected at operation 1704.

In one embodiment, the drive signals are configured to generate haptic outputs that constructively interfere with one another at a particular location or selected location of an input or user interface surface associated with or coupled to the haptic actuators. In other cases, the drives signals are configured to generate haptic outputs that destructively interfere with one another at a particular location or more than one location of the input or user interface surface. In other cases, the drive signals are configured to vibrate a region of the input or user interface surface at a particular frequency.

It may be appreciated that the specific examples listed above are not exhaustive; any number of suitable drive signals can be applied to any number of haptic actuators.

FIG. 18 is a flow chart depicting example operations of a method of receiving force input. The method 1800 begins at operation 1802 in which an indication that a user is touching an input surface or user interface surface is received. Next, at operation 1804, output from a force input sensor and/or a force transducer is received. Finally, at operation 1806, the output can be correlated to a non-binary magnitude of force applied to the input surface or user interface surface.

As noted above, many embodiments described herein reference a force input/haptic output interface operated in conjunction with a non-display region of a portable electronic device, such as a trackpad of a laptop computer. It may be appreciated, however, that this is merely one example; other configurations, implementations, and constructions are contemplated in view of the various principles and methods of operation, and reasonable alternatives thereto, described in reference to the embodiments described above.

For example, without limitation, a force input/haptic output interface can be additionally or alternatively associated with: a display surface; an enclosure or enclosure surface; a planar surface; a curved surface; an electrically conductive surface; an electrically insulating surface; a rigid surface; a flexible surface; a key cap surface; a trackpad surface; a display surface; and so on. The user interface surface can be, without limitation: a front surface; a back surface; a sidewall surface; or any suitable surface of an electronic device or electronic device accessory. Typically, the user interface surface of a force input/haptic output interface is an external surface of the associated portable electronic device but this may not be required.

Further, although many embodiments reference a force input/haptic output interface positioned in a portable electronic device (such as a cell phone or tablet computer) it may be appreciated that a force input/haptic output interface can be incorporated into any suitable electronic device, system, or accessory including but not limited to: portable electronic devices (e.g., battery-powered, wirelessly-powered devices, tethered devices, and so on); stationary electronic devices; control devices (e.g., home automation devices, industrial automation devices, aeronautical or terrestrial vehicle control devices, and so on); personal computing devices (e.g., cellular devices, tablet devices, laptop devices, desktop devices, and so on); wearable devices (e.g., implanted devices, wrist-worn devices, eyeglass devices, and so on); accessory devices (e.g., protective covers such as keyboard covers for tablet computers, stylus input devices, charging devices, and so on); and so on.

One may appreciate that although many embodiments are disclosed above, that the operations and steps presented with respect to methods and techniques described herein are meant as exemplary and accordingly are not exhaustive. One may further appreciate that alternate step order or, fewer or additional operations may be required or desired for particular embodiments.

For example, as noted above a force transducer can be configured in a number of suitable ways. An example force transducer includes a ground electrode and a drive and/or sense electrode separated by a body formed from a material that is configured to contract or expand in the presence of an electric field and, additionally, develop a measureable charge in response to compression or strain. Suitable materials include, but may not be limited to: lead-based piezoelectric alloys; non-leaded materials such as metal niobates or barium titanate; in addition to electroactive polymers. In other examples, other piezoelectric compositions or multilayered or interdigitated elements can be selected.

In many embodiments, a force transducer is communicably coupled to a controller that includes drive circuitry and/or sense circuitry. The drive circuit is configured to apply a drive signal to the drive and/or sense electrode of the force transducer. The drive signal can be any suitable signal including, but not limited to: a voltage bias; a voltage signal; an alternating signal; and so on. In some cases, the drive signal has an arbitrary waveform. The drive circuit can include one or more signal processing stages that may be used to generate, augment, or smooth the drive signal. For example, the drive circuit can include one or more of, without limitation and in no particular order: amplifying stages; filtering stage; multiplexing stages; digital-to-analog conversion stages; analog-to-digital conversion stages; comparison stages; feedback stages; and so on. The drive circuit can be implemented with analog circuit components, digital circuit components, passive circuit components, and/or active circuit components. In some examples, the drive circuit is implemented as an integrated circuit.

As with the drive circuit, the sense circuit, configured to receive voltage signals from the force transducer, can be implemented in any number of suitable ways. In many examples, the sense circuit includes one or more signal processing stages that may be used to receive, amplify, augment, or smooth a sense signal obtained from one or more of the sense electrodes. For example, the sense circuit can include one or more of, without limitation and in no particular order: amplifying stages; filtering stages; multiplexing stages; digital-to-analog conversion stages; analog-to-digital conversion stages; comparison stages; feedback stages; and so on. The sense circuit can be implemented with analog circuit components, digital circuit components, passive circuit components, and/or active circuit components. In some examples, the sense circuit is implemented as a single integrated circuit.

Once a sense signal (or more than one sense signal) is obtained, the sense circuit can correlate the one or more properties of the sense signal(s) to an amount of compression or strain experienced by the force transducer. In other cases, the sense circuit can correlate the measurement directly to an amount of force applied to the force transducer.

In many cases, drive circuitry and sense circuitry (or, more generally, a "controller") can be configured to operate a haptic actuator and a force input sensor simultaneously. In these examples, sense circuitry can be configured to adjust an output received from a force input sensor bases on an operation of drive circuitry. For example, in one embodiment, a sense signal received by sense circuitry may have an increased amplitude due to a simultaneously or substantially simultaneous actuation of a haptic actuator. In this example, the sense circuitry can be configured to adjust and/or filter the sense signal based on the drive signal. In other cases, a sense signal received by sense circuitry may have a decreased amplitude due to a simultaneously or substantially simultaneous actuation of a haptic actuator. In this example, the sense circuitry can compensate for effects of the actuation by increasing the amplitude of the sense signal based on the drive signal. In still other cases, the sense signal and the drive signal may be out-of-band with respect to one another.

For example, a drive signal may have a central frequency between 100 Hz and 250 Hz whereas a sense signal may have a central frequency between 0 Hz and 10 Hz. In these examples, the sense circuitry may be configured with a low-pass filter.

It may be appreciated that any implementation of any embodiment described herein can be configured in this manner. For example, with reference to the electronic device 100 depicted in FIG. 1, the set of force transducers of the force input/haptic output interface 110 can be used to user provide haptic output to a user and/or to receive force input from the user. For example, in a first mode (e.g., a "drive mode" or a "haptic mode"), the set of force transducers can be operated individually or collectively (e.g., constructively or destructively interfering at one or more locations) to produce a haptic output through the user interface surface. The haptic output can be any suitable output, such as a click, vibration, lateral shift, vertical shift, and so on.

In many cases, a haptic output is generated in conjunction with a function or operation of the electronic device 100. For example, a user of the electronic device 100 can receive a first haptic output after selecting (e.g., with a cursor) a first element rendered in a graphical user interface displayed by the primary display 104. The user can receive a second haptic output after selecting a second element rendered in the same graphical user interface. The first or second haptic outputs may be transient or sustained.

In some cases, one or more characteristics of a haptic output generated by the set of force transducers can depend upon a mode, state, application, function, setting, operation, or task of the electronic device 100. A haptic characteristic can include, but may not be limited to: duration; intensity; amplitude; sound; location; type of displacement; frequency of vibration; amount of ring-down compensation; and so on. Any suitable haptic characteristic can be used.

In further cases, more than one haptic output can be generated by the set of force transducers at a particular time. For example, a first force transducer located at a first location of the user interface surface can generate a first haptic output while a second force transducer located at a second location of the user interface surface can generate a second haptic output. The different haptic outputs may be associated with different locations of the user interface surface.

In another example, in a second mode (e.g., a "sense mode" or an "input mode"), the set of force transducers can be operated individually or collectively to produce an electrical signal in response to a force input applied to the user interface surface. The electrical signal can be correlated (e.g., by a controller or circuitry in signal communication with the set of force transducers) to a magnitude and/or location of force applied by one or more objects in contact with the user interface surface. In some examples, the force input/haptic output interface 110 can be operated in the sense mode and the drive mode simultaneously. In other cases, the force input/haptic output interface 110 can alternatively operate in the drive mode and the sense mode.

Further to the foregoing, although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
a frame having a first section and a second section having reduced thickness relative to the first section;
a cover coupled to the frame, the cover having an interior surface and an external surface;
a sensor disposed on the interior surface;
a stiffener associated with the cover; and
a haptic output element;
wherein the second section and the haptic output element are spaced apart by a gap, the gap permitting the haptic output element to move toward the second section of the frame when an input is received at the external surface of the cover.

2. The electronic device of claim 1, wherein the external surface of the cover defines an input surface to receive the input and to provide haptic output.

3. The electronic device of claim 1, wherein the sensor is a capacitive touch sensor configured to detect a change in capacitance at the cover.

4. The electronic device of claim 1, further comprising a seal positioned between the frame and the interior surface of the cover, the seal inhibiting ingress of contaminants between the cover and the frame.

5. The electronic device of claim 4, wherein the seal is compressible to permit at least a portion of the cover to move relative to the frame.

6. The electronic device of claim 1, wherein the sensor is a first sensor and the electronic device further comprises a second sensor, the second sensor being a capacitive force sensor comprising two electrical contacts separated by a flexible material comprising at least one of a silicone, plastic, glass, or gel.

7. The electronic device of claim 6, wherein the second sensor is positioned between the first sensor and the stiffener.

8. The electronic device of claim 1, wherein the stiffener forms a locally-stiffened region at the cover.

9. The electronic device of claim 1, wherein the haptic output element is coupled to the stiffener.

10. The electronic device of claim 1, wherein a filler material is disposed within the gap.

11. The electronic device of claim 10, wherein the filler material comprises at least one of a foam, adhesive, liquid, or gas.

12. An electronic device comprising:
a frame having a first section and a second section having reduced thickness as compared to the first section;
a cover coupled to the frame, the cover forming an interior surface and an external surface;
a first sensor disposed on the interior surface of the cover;
a haptic output element coupled to the second section of the frame and configured to bend the second section in response to an input to the external surface; and
a spacer positioned between the second section and the first sensor;
wherein the second section of the frame is bendable in a direction away from the cover.

13. The electronic device of claim 12, wherein the spacer is configured to deform to permit the first sensor to move relative to the second section when an input is received at the external surface of the cover.

14. The electronic device of claim 13, wherein the spacer comprises at least one of a silicone, plastic, glass, gel, or pressure-sensitive adhesive.

15. The electronic device of claim 12, further comprising a seal positioned between the frame and the interior surface of the cover, the seal inhibiting ingress of contaminants between the cover and the frame.

16. The electronic device of claim 15, wherein the seal is compressible to permit at least a portion of the cover to move relative to the frame.

17. The electronic device of claim 12, further comprising a second sensor configured to measure a force applied to the cover.

18. The electronic device of claim 12, further comprising a second sensor positioned between the spacer and the first sensor.

19. The electronic device of claim 12, further comprising drive circuitry in communication with the haptic output element, the drive circuitry is configured to actuate the haptic output element.

20. A keyboard comprising:
a frame;
a cover coupled to the frame, the cover forming an interior surface and an external surface;
a seal positioned between the frame and the interior surface of the cover, the seal inhibiting ingress of contaminants between the cover and the frame;
a capacitive touch sensor disposed on the interior surface and configured to detect a change in capacitance at the cover;
a capacitive force sensor positioned adjacent the capacitive touch sensor, the capacitive force sensor comprising two electrical contacts separated by a flexible material;
a stiffener positioned adjacent the capacitive force sensor; and
a haptic output element coupled to the stiffener, the haptic output element being positioned to define a gap between the haptic output element and a reduced thickness section of the frame, the gap permitting the haptic output element to move toward the reduced thickness section of the frame when an input is received at the external surface of the cover.

* * * * *